United States Patent
Arakawa

(10) Patent No.: US 11,245,866 B2
(45) Date of Patent: Feb. 8, 2022

(54) DISPLAY CONTROL DEVICE AND DISPLAY CONTROL METHOD

(71) Applicant: CLARION CO., LTD., Saitama (JP)

(72) Inventor: Akiko Arakawa, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/988,979

(22) Filed: Aug. 10, 2020

(65) Prior Publication Data

US 2021/0099662 A1   Apr. 1, 2021

(30) Foreign Application Priority Data

Sep. 26, 2019   (JP) .............................. JP2019-176118

(51) Int. Cl.
*H04N 5/445*   (2011.01)
*B60R 1/00*    (2006.01)
(Continued)

(52) U.S. Cl.
CPC ............... *H04N 5/445* (2013.01); *B60R 1/00* (2013.01); *B60R 11/04* (2013.01); *G09G 5/14* (2013.01);
(Continued)

(58) Field of Classification Search
CPC ..... B60R 11/04; B60R 1/00; B60R 2011/004; B60R 2300/105; B60R 2300/306;
(Continued)

(56) References Cited

U.S. PATENT DOCUMENTS

| 9,487,139 B1 | 11/2016 | Ishida et al. |
| 2009/0135253 A1 | 5/2009 | Augst |

(Continued)

FOREIGN PATENT DOCUMENTS

| EP | 3 505 398 A1 | 7/2019 |
| JP | H06-227318 A | 8/1994 |

(Continued)

OTHER PUBLICATIONS

Extended European Search Report mailed by European Patent Office dated Feb. 10, 2021 in corresponding European patent application No. 20197365.8-1132.

*Primary Examiner* — Farzana Hossain
(74) *Attorney, Agent, or Firm* — IP Business Solutions, LLC

(57) ABSTRACT

A display control device is disposed in a vehicle in which a camera photographing a first captured image indicating an image on a rear right side of the vehicle and a display displaying the first captured image are mounted. The display control device includes an image acquiring unit acquiring the first captured image from the camera and a display control unit controlling the first captured image displayed on the display. The display control unit causes the display to display one of a narrow angle image indicating a part of the first captured image and a wide angle image indicating an image in a range wider than the narrow angle image in the first captured image and to display the first captured image such that a size of a first region in displaying the wide angle image is larger than a size of the first region displaying the narrow angle image.

15 Claims, 9 Drawing Sheets

(51) Int. Cl.

| | | |
|---|---|---|
| *B60R 11/04* | (2006.01) | |
| *G09G 5/14* | (2006.01) | |
| *H04N 5/225* | (2006.01) | |
| *H04N 5/232* | (2006.01) | |
| *H04N 5/262* | (2006.01) | |
| *H04N 5/268* | (2006.01) | |
| *B60R 11/00* | (2006.01) | |
| *H04N 5/247* | (2006.01) | |

(52) U.S. Cl.
CPC ....... *H04N 5/2253* (2013.01); *H04N 5/23238* (2013.01); *H04N 5/268* (2013.01); *H04N 5/2628* (2013.01); *B60R 2011/004* (2013.01); *B60R 2300/105* (2013.01); *B60R 2300/306* (2013.01); *B60R 2300/802* (2013.01); *B60R 2300/8046* (2013.01); *G09G 2380/10* (2013.01); *H04N 5/247* (2013.01)

(58) Field of Classification Search
CPC ...... B60R 2300/802; B60R 2300/8046; B60R 2300/207; B60R 2300/605; B60R 2300/70; G09G 2380/10; G09G 5/14; H04N 5/2253; H04N 5/23238; H04N 5/247; H04N 5/2628; H04N 5/268; H04N 5/445

See application file for complete search history.

(56) References Cited

U.S. PATENT DOCUMENTS

| | | | | |
|---|---|---|---|---|
| 2014/0232538 | A1* | 8/2014 | Sobue | G06K 9/00805 |
| | | | | 340/435 |
| 2014/0347489 | A1* | 11/2014 | Kumon | H04N 7/183 |
| | | | | 348/148 |
| 2018/0253904 | A1* | 9/2018 | Kuwabara | G08G 1/167 |
| 2019/0052843 | A1 | 2/2019 | Izumi et al. | |
| 2019/0199940 | A1 | 6/2019 | Shidochi et al. | |
| 2019/0315228 | A1* | 10/2019 | Hayashi | G08G 1/0962 |
| 2019/0381935 | A1* | 12/2019 | Konstantin | G08G 1/166 |
| 2020/0207275 | A1* | 7/2020 | Shimotani | B60R 1/12 |

FOREIGN PATENT DOCUMENTS

| | | |
|---|---|---|
| JP | H10-257482 A | 9/1998 |
| JP | 2015-136056 A | 7/2015 |
| JP | 2018-176874 A | 11/2018 |
| WO | 2008/000365 A1 | 1/2008 |
| WO | 2019/058504 A1 | 3/2019 |

* cited by examiner

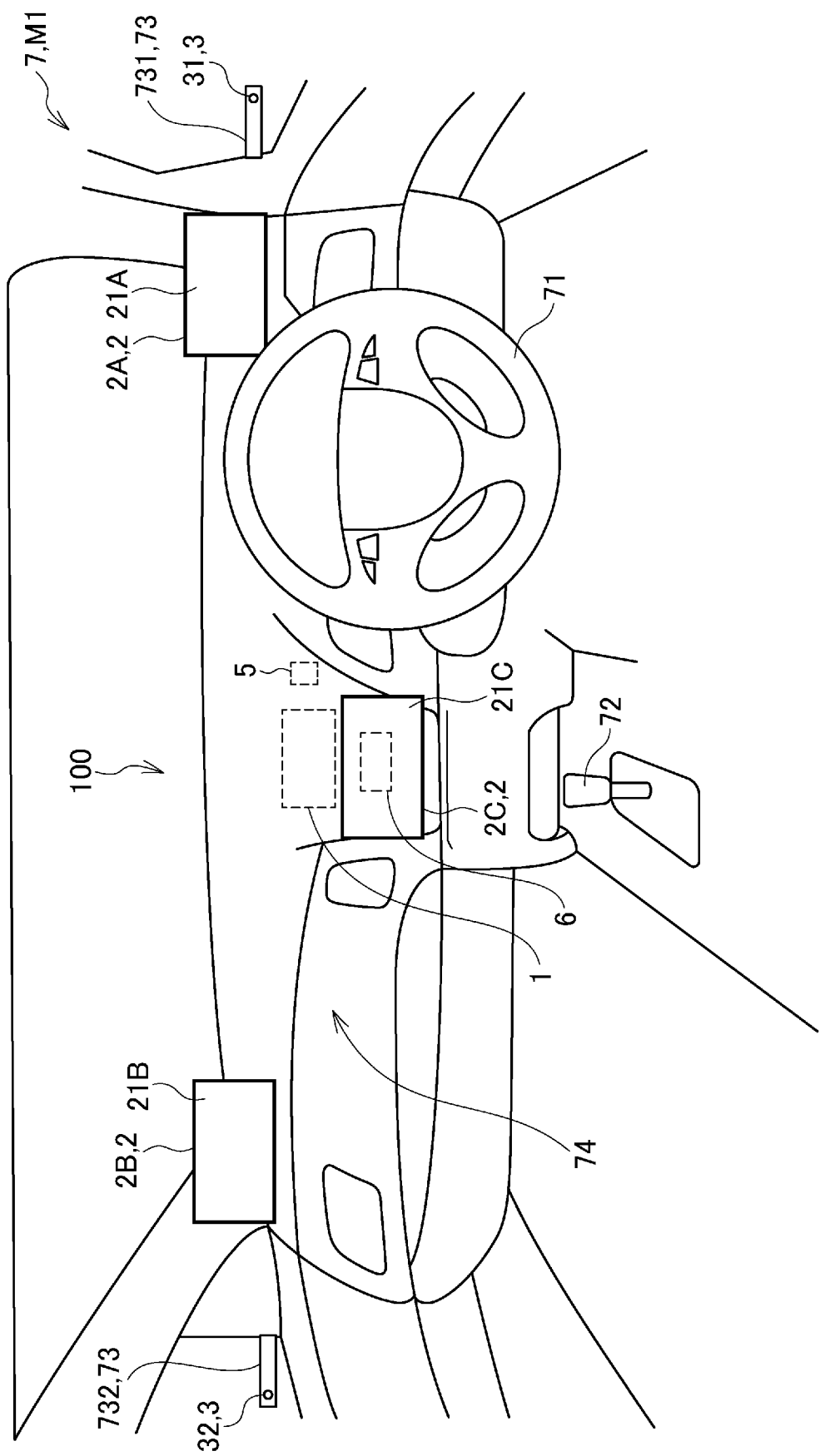

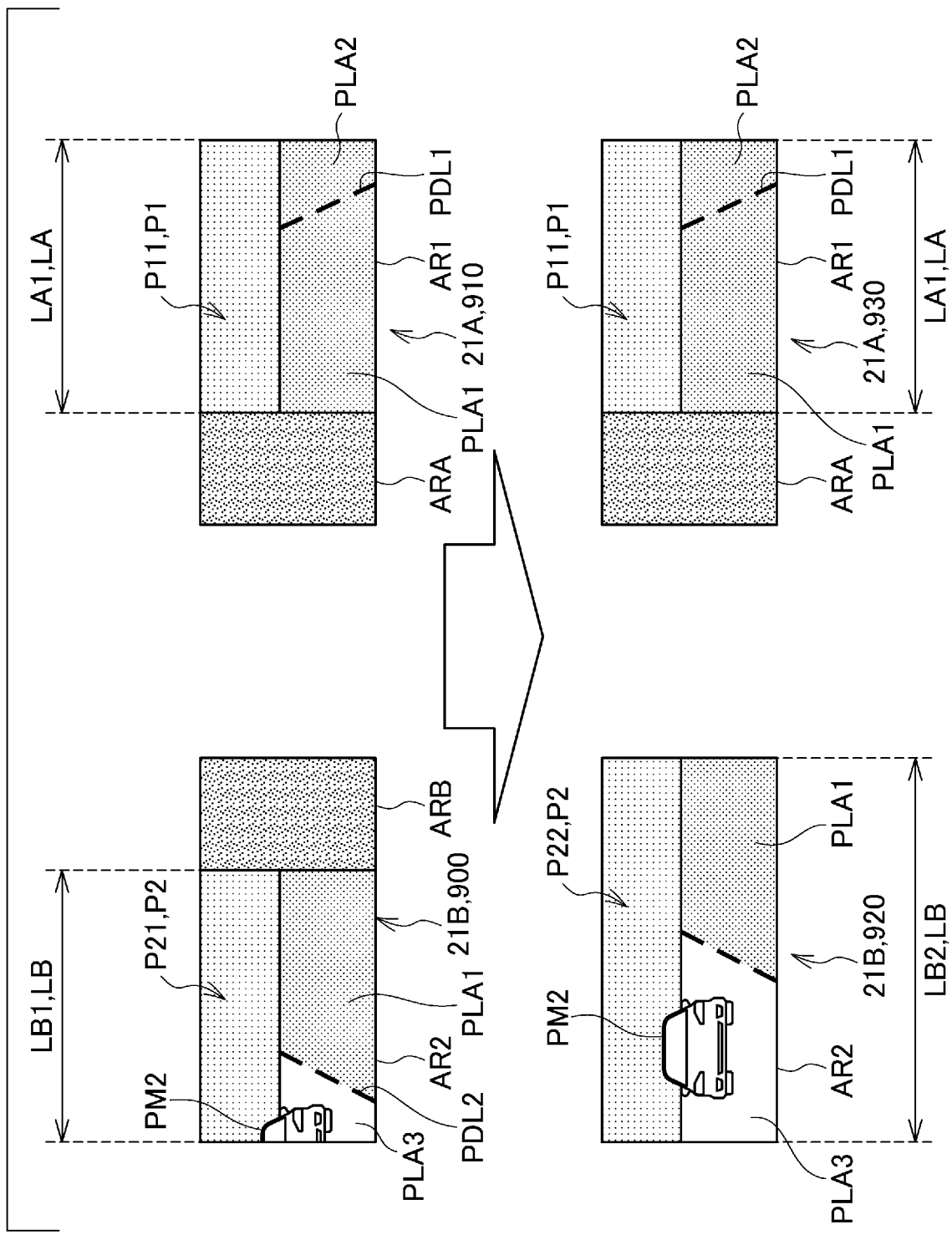

DISPLAY CONTROL DEVICE AND DISPLAY CONTROL METHOD

INCORPORATION BY REFERENCE

The present application claims priority under 35 U.S.C. § 119 to Japanese Patent Application No. 2019-176118 filed on Sep. 26, 2019. The content of the application is incorporated herein by reference in its entirety.

BACKGROUND OF THE INVENTION

Field of the Invention

The present invention relates to a display control device and a display control method.

Description of the Related Art

There has been known a technique concerning an electronic mirror that displays, on a display device, images on the rear right side and the rear left side of a vehicle.

For example, in a driving support device described in Japanese Patent Application Laid-Open Publication No. 2015-136056 (Patent Literature 1), when determining that other vehicles are absent in a near range of an own vehicle, a control unit displays a captured image acquired from a camera on a display as a narrow angle image in a range equivalent to an angle of view narrower than a full angle of view in the horizontal direction. On the other hand, when determining that other vehicles are present in the near range of the own vehicle, the control unit displays the captured image as a wide angle image having an angle of view in the horizontal direction wider than the angle of view of the narrow angle image. Alternatively, the control unit applies smoothing processing to image information corresponding to a set partial target region in the captured image acquired from the camera and displays, on the display, a captured image including the image information subjected to the smoothing processing.

In the driving supporting device described in Patent Literature 1, since a size of a displayable region of the display is fixed, when switching the narrow angle image to the wide angle image, the control unit changes an aspect ratio of a partial area of the captured image, deforms an image in the area, and displays the image on the display. Therefore, a user visually feels discomfort. It is likely to be difficult for the user to grasp the distance between the own vehicle and an object such as another vehicle included in the captured image.

SUMMARY OF THE INVENTION

Therefore, an object of the present invention is to provide a display control device and a display control method capable of, when switching a narrow angle image to a wide angle image, displaying a captured image without causing visual discomfort for a user.

A display control device according to an aspect of the present invention is a display control device mounted on a vehicle in which a camera and a first display device are mounted, the camera photographing a first image indicating at least one of images on a rear right side and a rear left side of the vehicle and the first display device displaying the first image, the display control device including: an image acquiring unit that acquires the first image from the camera; and a display control unit that controls the first image displayed on the first display device. The display control unit causes the first display device to display one of a narrow angle image indicating a part of the first image and a wide angle image indicating an image in a range wider than the narrow angle image in the first image and causes the first display device to display the first image such that a size of a first display region for displaying the wide angle image is large compared with a size of a second display region for displaying the narrow angle image.

In the display control device, a size of the first display region in a lateral direction may be large compared with a size in the lateral direction of the second display region, and the lateral direction may correspond to a left-right direction of a display surface of the first display device in a real space.

In the display control device, when displaying the wide angle image, the display control unit may cause the first display device to display the first image such that a magnification and reduction rate of the first image is substantially same compared with when displaying the narrow angle image.

In the display control device, the display control unit may cause the first display device to display the first image and a second image displayed in a position adjacent to the first image in the first display device and, when displaying the wide angle image on the first display device, cause the first display device to display the second image such that a size of a display region for displaying the second image is small compared with when displaying the narrow angle image on the first display device.

In the display control device, the display control device may further include an information acquiring unit that acquires at least any one of information concerning operation of the vehicle, information concerning a vehicle around the vehicle, and information concerning a road on which the vehicle travels, and the display control unit may determine, according to the information acquired by the information acquiring unit, whether to cause the first display device to display the narrow angle image or cause the first display device to display the wide angle image.

In the display control device, the information concerning the operation of the vehicle may include information indicating an operation direction of blinkers mounted on the vehicle, the information concerning the vehicle around the vehicle may include information indicating that a vehicle traveling behind the vehicle approaches the vehicle, and the information concerning the road may include information indicating a merging point of the road.

In the display control device, the display control device may further include a setting unit that sets a priority level for each of the kinds of information acquired by the information acquiring unit, and the display control unit may control, according to the priority level, the first image displayed on the first display device.

In the display control device, a second display device may be mounted on the vehicle, the camera may image the rear right side of the vehicle to capture the first image and image the rear left side of the vehicle to capture a third image, the image acquiring unit may acquire the first image and the third image from the camera, and the display control unit may control the third image displayed on the second display device, cause the second display device to display one of a narrow angle image indicating a part of the third image and a wide angle image indicating an image in a wider range than the narrow angle image in the third image, and cause the second display device to display the third image such that a size of a third display region for displaying the wide angle image is large compared with a size of a fourth display region for displaying the narrow angle image.

A display control method according to an aspect of the present invention is a display control method for a display control device mounted on a vehicle in which a camera and a first display device are mounted, the camera photographing a first image indicating at least one of images on a rear right side and a rear left side of the vehicle and the first display device displaying the first image, the display control method including: an image acquiring step in which the display control device acquires the first image from the camera; and a display control step in which the display control device controls the first image displayed on the first display device. In the display control step, the display control device causes the first display device to display one of a narrow angle image indicating a part of the first image and a wide angle image indicating an image in a range wider than the narrow angle image in the first image and causes the first display device to display the first image such that a size of a first display region for displaying the wide angle image is large compared with a size of a second display region for displaying the narrow angle image.

In the display control method, a size of the first display region in a lateral direction may be large compared with a size in the lateral direction of the second display region, and the lateral direction may correspond to a left-right direction of a display surface of the first display device in a real space.

In the display control method, in the display control step, when displaying the wide angle image, the display control display may cause the first display device to display the first image such that a magnification and reduction rate of the first image is substantially same compared with when displaying the narrow angle image.

In the display control method, in the display control step, the display control device may cause the first display device to display the first image and a second image displayed in a position adjacent to the first image in the first display device and, when displaying the wide angle image on the first display device, cause the first display device to display the second image such that a size of a display region for displaying the second image is small compared with when displaying the narrow angle image on the first display device.

In the display control method, the display control method may further include an information acquiring step in which the display control device acquires at least any one of information concerning operation of the vehicle, information concerning a vehicle around the vehicle, and information concerning a road on which the vehicle travels, and, in the display control step, the display control device may determine, according to the information acquired in the information acquiring step, whether to cause the first display device to display the narrow angle image or cause the first display device to display the wide angle image.

In the display control method, the display control method may further include a setting step in which the display control device sets a priority level for each of the kinds of information acquired in the information acquiring step, and, in the display control step, the display control device may control, according to the priority level, the first image displayed on the first display device.

In the display control method, a second display device may be mounted on the vehicle, the camera may image the rear right side of the vehicle to capture the first image and image the rear left side of the vehicle to capture a third image, in the image acquiring step, the image control device may acquire the first image and the third image from the camera, and, in the display control step, the display control device may control the third image displayed on the second display device, cause the second display device to display one of a narrow angle image indicating a part of the third image and a wide angle image indicating an image in a wider range than the narrow angle image in the third image, and cause the second display device to display the third image such that a size of a third display region for displaying the wide angle image is large compared with a size of a fourth display region for displaying the narrow angle image.

With the display control device and the display control method according to the present invention, when switching a narrow angle image to a wide angle image, it is possible to display a captured image without causing visual discomfort for a user.

BRIEF DESCRIPTION OF THE DRAWINGS

FIG. 8 is a diagram showing an example of disposition of equipment around a driver's seat in a second embodiment; and FIG. 9 is a screen diagram showing an example of a change of image display screens in the switching from the narrow angle image to the wide angle image in the situation shown in FIG. 3.

DETAILED DESCRIPTION OF THE PREFERRED EMBODIMENTS

Embodiments of the present invention are explained below with reference to the drawings.

[1. Configuration of a Display Control System]

[1-1. Overall Configuration of the Display Control System]

Figure 1:
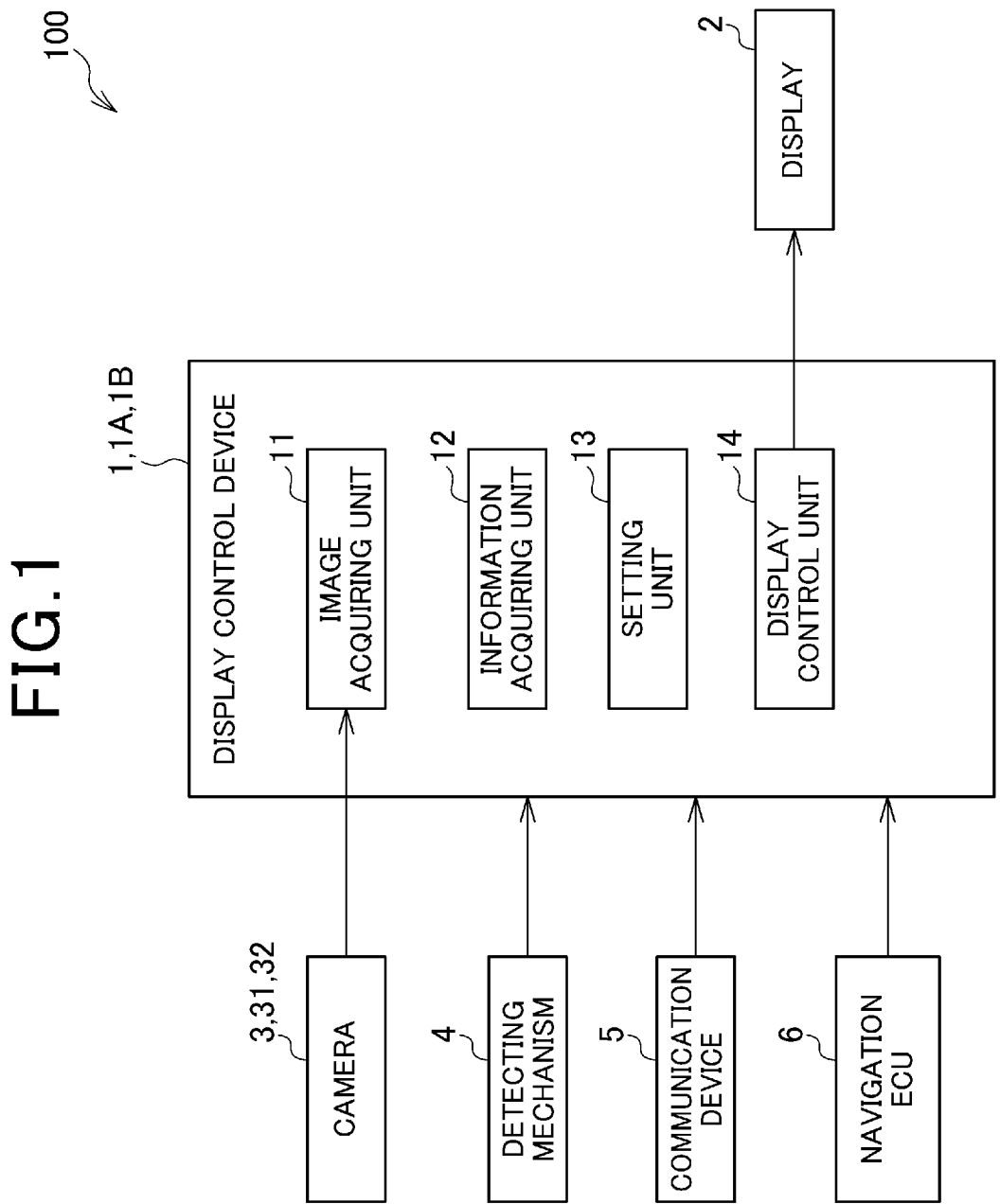
FIG. 1 is a diagram showing an example of an overall configuration of a display control system.

FIG. 1 is a diagram showing an example of an overall configuration of a display control system 100 according to an embodiment of the present invention.

The display control system 100 is mounted on a vehicle M1 and includes a display control device 1, a display 2, a camera 3, a detecting mechanism 4, a communication device 5 (receiver/transmitter), and a navigation ECU 6.

The embodiments of the present invention include a first embodiment explained with reference to FIGS. 2 to 7 and a second embodiment explained with reference to FIGS. 8 and 9.

In the embodiments of the present invention, the vehicle M1 is, for example, a four-wheel passenger car. Note that the vehicle M1 may be an engine-driven automobile, may be a motor-driven automobile (a so-called electric automobile), or may be an automobile driven by a motor and an engine (a so-called hybrid car). The vehicle M1 may be a large vehicle such as a truck or a bus or may be a motorcycle. The vehicle M1 may be a work vehicle such as a tractor. The vehicle M1 is explained in detail below with reference to FIG. 2.

The display control device 1 controls an image displayed on the display 2. The display control device 1 includes a memory 1A and a processor 1B.

The memory 1A is a storage device that stores, in a nonvolatile manner, programs, data, and the like to be executed by the processor 1B. The memory 1A is configured by a magnetic storage device, a semiconductor storage element such as a flash read only memory (ROM), or other types of nonvolatile storage devices. The memory 1A may include a random access memory (RAM) configuring a work area of the processor 1B. The memory 1A stores data to be processed by the display control device 1 and a control program and the like to be executed by the processor 1B.

The processor 1B may be configured by a single processor. A plurality of processors may function as the processor 1B.

In the embodiments of the present invention, the display control device 1 is configured as, for example, an electronic control unit (ECU).

The display control device 1 is communicatively connected to each of the display 2, the camera 3, the detecting mechanism 4, the communication device 5, and the navigation ECU 6. The display control device 1 communicates with each of the display 2, the camera 3, the detecting mechanism 4, the communication device 5, and the navigation ECU 6 according to a standard such as Ethernet (registered trademark).

The display control device 1 corresponds to an example of the "display control devices".

The display 2 includes a liquid crystal display (LCD) or the like and displays various images according to an instruction of the display control device 1. The various images include a captured image generated by the camera 3, a meter image showing various meters including a speed meter, a navigation image, and an in-vehicle Infotainment (IVI) image.

The navigation image includes a map image and an image showing a position of the vehicle M1 in the map image. The navigation image corresponds to an image displayed by a so-called navigation device.

The IVI image includes an image for a user to select a channel of a television or a radio, a television image, and a reproduced image of a digital versatile disc (DVD).

The display 2 corresponds to an example of a "first display device".

The camera 3 is mounted on the vehicle M1 and generates a first captured image indicating an image of a rear left side of the vehicle M1 and a second captured image indicating an image of a rear right side of the vehicle M1.

Specifically, the camera 3 includes a first camera 31 and a second camera 32. The first camera 31 images the rear right side of the vehicle M1 and generates the first captured image indicating the image of the rear right side of the vehicle M1. The second camera 32 images the rear left side of the vehicle M1 and generates the second captured image indicating the image of the rear left side of the vehicle M1.

The camera 3 transmits information indicating the first captured image and information indicating the second captured image to the display control device 1.

The detecting mechanism 4 includes various detecting mechanisms mounted on the vehicle M1 and includes a distance sensor that detects the distances between the vehicle M1 and the other vehicles M2, M3, and the like and an operation detection switch that detects operation by a driver.

The distance sensor is configured by a radar detector, an infrared sensor, and the like.

The operation detection switch detects, for example, an operation direction of blinkers by the driver. The operation detection switch detects, for example, ON operation and OFF operation of hazard lamps by the driver.

Information indicating a detection result of the detecting mechanism 4 is transmitted to the display control device 1.

The communication device 5 executes inter-vehicle communication between the vehicle M1 and the other vehicles M2 and M3. That is, the communication device 5 configures a part of an inter-vehicle communication system.

In the inter-vehicle communication, for example, the communication device 5 receives position information on the other vehicles M2 and M3 from the other vehicles M2 and M3 and transmits the position information on the other vehicles M2 and M3 to the display control device 1.

For example, the display control device 1 acquires the position information on the other vehicles M2 and M3 from the communication device 5, acquires position information on the vehicle M1 from the navigation ECU 6, and detects the distance between the vehicle M1 and the other vehicles M2 and M3.

The navigation ECU 6 is an ECU that executes navigation.

The navigation ECU 6 executes road-to-vehicle communication and acquires congestion information, accident information, construction work information, speed control information, lane control information, and the like from a vehicle information and communication system.

The navigation ECU 6 transmits, to the display control device 1, information concerning a road on which the vehicle M1 travels. The information concerning the road on which the vehicle M1 travels includes information indicating a point where the road merges, information indicating a position of an intersection, and information indicating positions of an exit and an entrance of a freeway. The information concerning the road on which the vehicle M1 travels includes information indicating an automatic driving section and a manual driving section. The automatic driving section indicates a section of the road where traveling of the vehicle M1 by automatic driving is permitted. The manual driving section indicates a section of the road that is not the automatic driving section.

[1-2. Configuration of the Display Control Device]

The configuration of the display control device 1 is explained.

As shown in FIG. 1, the display control device 1 includes an image acquiring unit 11, an information acquiring unit 12, a setting unit 13, and a display control unit 14. Specifically, the processor 1B of the display control device 1 executes the control program stored in the memory 1A to thereby function as the image acquiring unit 11, the information acquiring unit 12, the setting unit 13, and the display control unit 14.

The image acquiring unit 11 acquires a captured image from the camera 3. Specifically, the image acquiring unit 11 acquires a first captured image from the first camera 31 and acquires a second captured image from the second camera 32.

Each of the first captured image and the second captured image corresponds to an example of a "first image". The second captured image corresponds to an example of a "third image".

Specifically, in the first embodiment explained with reference to FIGS. 2 to 7 below, the first captured image and the second captured image correspond to an example of the "first image". In the second embodiment explained with reference to FIGS. 8 and 9 below, the first captured image corresponds to an example of the "first image" and the second captured image corresponds to an example of the "third image".

The information acquiring unit 12 acquires information concerning operation of the vehicle M1, information concerning the vehicles M2 and M3 around the vehicle M1, and information concerning a road on which the vehicle M1 travels.

The information concerning the operation of the vehicle M1 includes information indicating an operation direction of the blinkers mounted on the vehicle M1.

The information concerning the vehicles M2 and M3 around the vehicle M1 includes information indicating that the vehicles M2 and M3 traveling behind the vehicle M1 approach the vehicle M1.

Information concerning the road includes information indicating a merging point of the road.

The setting unit 13 sets a priority level for each of the kinds of information acquired by the information acquiring unit 12.

For example, the setting unit 13 sets higher priority levels in the order of the information indicating that the vehicles M2 and M3 approach the vehicle M1, the information indicating the operation direction the blinkers mounted on the vehicle M1, and the information indicating the merging point of the road.

In other words, the setting unit 13 sets the priority levels as explained below. That is, the priority level of the information indicating that the vehicles M2 and M3 approach the vehicle M1 is higher than the priority level of each of the information indicating the operation direction of the blinkers mounted on the vehicle M1 and the information indicating the merging point of the road. The priority level of the information indicating the operation direction of the blinkers mounted on the vehicle M1 is higher than the priority level of the information indicating the merging point of the road and lower than the priority level of the information indicating that the vehicles M2 and M3 approach the vehicle M1. The priority level of the information indicating the merging point of the road is lower than the priority level of each of the information indicating that the vehicles M2 and M3 approach the vehicle M1 and the information indicating the operation direction of the blinkers mounted on the vehicle M1.

The display control unit 14 controls the first captured image and the second captured image displayed on the display 2.

Specifically, the display control unit 14 causes the display 2 to display one of a narrow angle image P11 indicating a part of the first captured image and a wide angle image P12 indicating an image in a wider range than the narrow angle image P11 in the first captured image. Each of the narrow angle image P11 and the wide angle image P12 corresponds to an example of the "first image".

An angle of view in the horizontal direction of the first captured image is, for example, 50 degrees. An angle of view in the horizontal direction of the narrow angle image P11 is, for example, 30 degrees. An angle of view in the horizontal direction of the wide angle image P12 is, for example, 50 degrees. That is, in the embodiments of the present invention, the wide angle image P12 coincides with the "first captured image".

The display control unit 14 causes the display 2 to display one of a narrow angle image P21 indicating a part of the second captured image and a wide angle image P22 indicating an image in a wider range than the narrow angle image P21 in the second captured image. Each of the narrow angle image P21 and the wide angle image P22 corresponds to an example of the "first image".

An angle of view in the horizontal direction of the second captured image is, for example, 50 degrees. An angle of view in the horizontal direction of the narrow angle image P21 is, for example, 30 degrees. An angle of view in the horizontal direction of the wide angle image P22 is, for example, 50 degrees. That is, in the embodiments of the present invention, the wide angle image P22 coincides with the "second captured image".

The narrow angle image P11, the wide angle image P12, the narrow angle image P21, and the wide angle image P22 are explained in detail below with reference to FIGS. 4, 6, and 9.

The display control unit 14 determines, according to the information acquired by the information acquiring unit 12, whether to cause the display 2 to display the narrow angle image P11 or to cause the display 2 to display the wide angle image P12. The display control unit 14 determines, according to the information acquired by the information acquiring unit 12, whether to cause the display 2 to display the narrow angle image P21 or to cause the display 2 to display the wide angle image P22.

In the embodiments of the present invention, the image acquiring unit 11 acquires the first captured image from the first camera 31 and acquires the second captured image from the second camera 32. However, the embodiments of the present invention are not limited to this. The image acquiring unit 11 only has to acquire at least one of the first captured image and the second captured image from the camera 3. For example, the image acquiring unit 11 may acquire the first captured image and may not acquire the second captured image. For example, the image acquiring unit 11 may acquire the second captured image and may not acquire the first captured image.

In the embodiments of the present invention, the information acquiring unit 12 acquires the information concerning the operation of the vehicle M1, the information concerning the vehicles M2 and M3 around the vehicle M1, and information concerning the road on which the vehicle M1 travels. However, the embodiments of the present invention are not limited to this. The information acquiring unit 12 only has to acquire at least any one of the information concerning the operation of the vehicle M1, the information concerning the vehicles M2 and M3 around the vehicle M1, and the information concerning the road on which the vehicle M1 travels. For example, the information acquiring unit 12 may acquire only the information concerning the operation of the vehicle M1. For example, the information acquiring unit 12 may acquire only the information concerning the vehicles M2 and M3 around the vehicle M1. For example, the information acquiring unit 12 may acquire the information concerning the operation of the vehicle M1 and the information concerning the vehicles M2 and M3 around the vehicle M1 and may not acquire the information concerning the road on which the vehicle M1 travels.

2. First Embodiment

[2-1. Disposition of the Display Control System]

Figure 2:
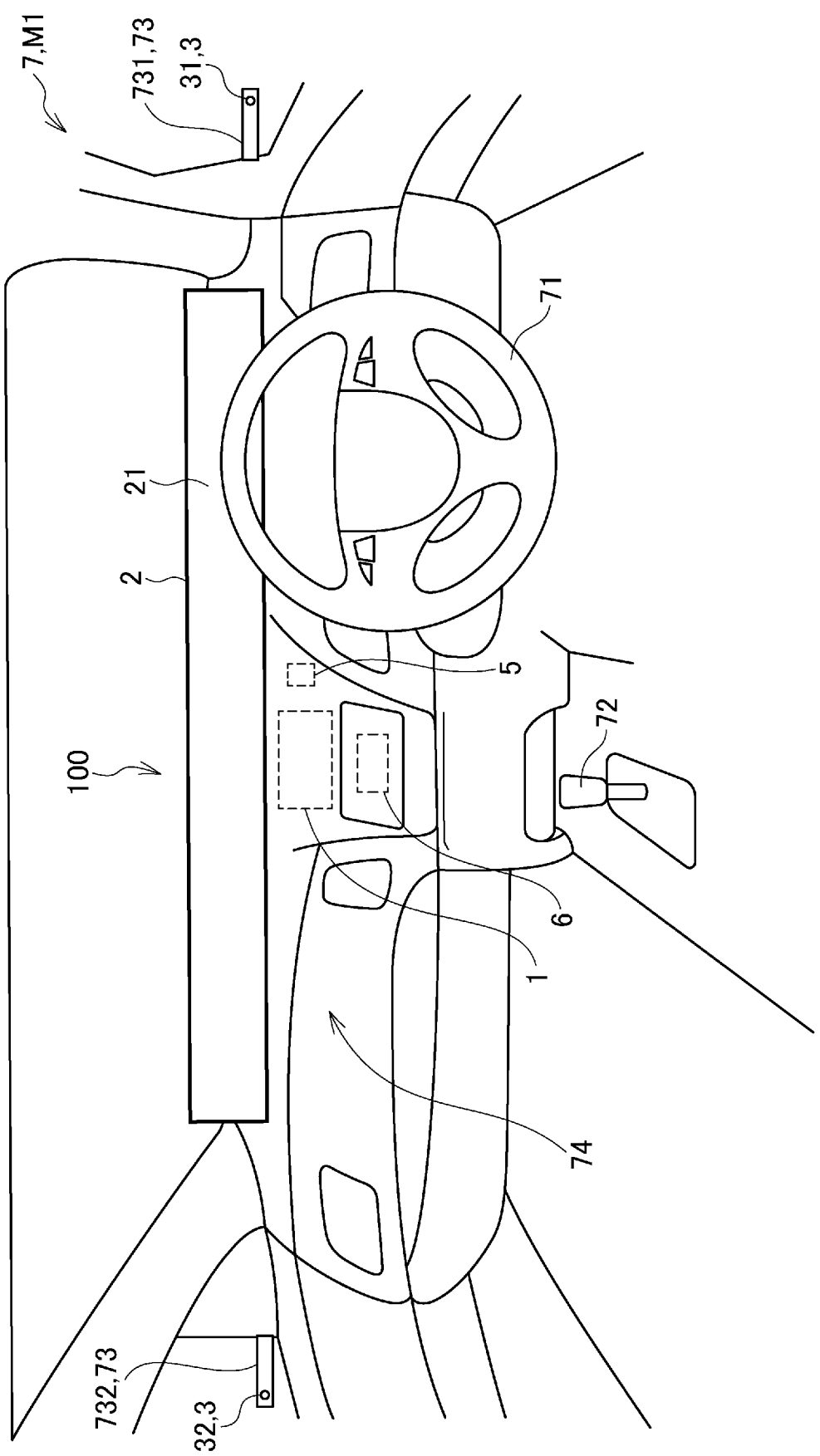
FIG. 2 is a diagram showing an example of disposition of equipment around a driver's seat in a first embodiment.

FIG. 2 is a diagram showing an example of disposition of equipment around a driver's seat in the vehicle M1 on which the display control system 100 according to a first embodiment is mounted.

In the following explanation, the vehicle M1 may be described as vehicle 7.

As shown in FIG. 2, the vehicle 7 includes a steering wheel 71, a selector 72, a camera supporting body 73, and a dashboard 74.

When changing a traveling direction of the vehicle 7, a driver rotates the steering wheel 71. For example, when changing the traveling direction to the right direction, the driver rotates the steering wheel 71 clockwise. When changing the traveling direction to the left direction, the driver rotates the steering wheel 71 counterclockwise.

When changing an operation state of the vehicle 7, the driver operates the selector 72. The selector 72 is configured to enable the driver to select, for example, a D range, an R range, a P range, or an N range. When driving the vehicle M1 forward, the driver selects the D range. When driving the vehicle M1 backward, the driver selects the R range. When parking the vehicle M1, the driver selects the P range. When temporarily stopping the vehicle M1, the driver selects the N range.

The camera supporting body 73 includes a right side supporting body 731 and a left side supporting body 732. The right side supporting body 731 is a bar-like member disposed on the front right side of a vehicle body and supporting the first camera 31. The left side supporting body 732 is a bar-like member disposed on the front left side of the vehicle body and supporting the second camera 32.

The dashboard 74 is disposed in the front in the interior of the vehicle 7. The display control device 1, the display 2, the communication device 5, and the navigation ECU 6 are disposed in the dashboard 74.

The dashboard 74 houses each of the display control device 1, the communication device 5, and the navigation ECU 6.

The display 2 is disposed on the upper surface of the dashboard 74 along the left-right direction of the vehicle 7. The display 2 includes a display surface 21. Various images are displayed on the display surface 21. The display surface 21 is disposed to face the rear of the vehicle 7. The display surface 21 has a rectangular plane shape. Note that the display surface 21 may be a curved surface formed by bending one side of the rectangular plane in an arcuate shape. That is, the display surface 21 may be a curved surface forming a part of the circumferential surface of a cylinder.

A size in the left-right direction of the display surface 21 is large compared with a size in the up-down direction of the display surface 21. For example, the size in the left-right direction is in a range of three times to twenty times of the size in the up-down direction. Specifically, the size in the up-down direction of the display surface 21 is, for example, 100 mm. The size in the left right direction is, for example, 1000 mm.

The first camera 31 is disposed on the right side supporting body 731 to image the rear right side of the vehicle 7. Specifically, the first camera 31 is disposed to face backward at the distal end portion of the right side supporting body 731. The second camera 32 is disposed on the left side supporting body 732 to image the rear left side of the vehicle 7. Specifically, the second camera 32 is disposed to face backward at the distal end portion of the left side supporting body 732.

[2-2. First Situation in which the Narrow Angle Image is Switched to the Wide Angle Image]

Figure 3:
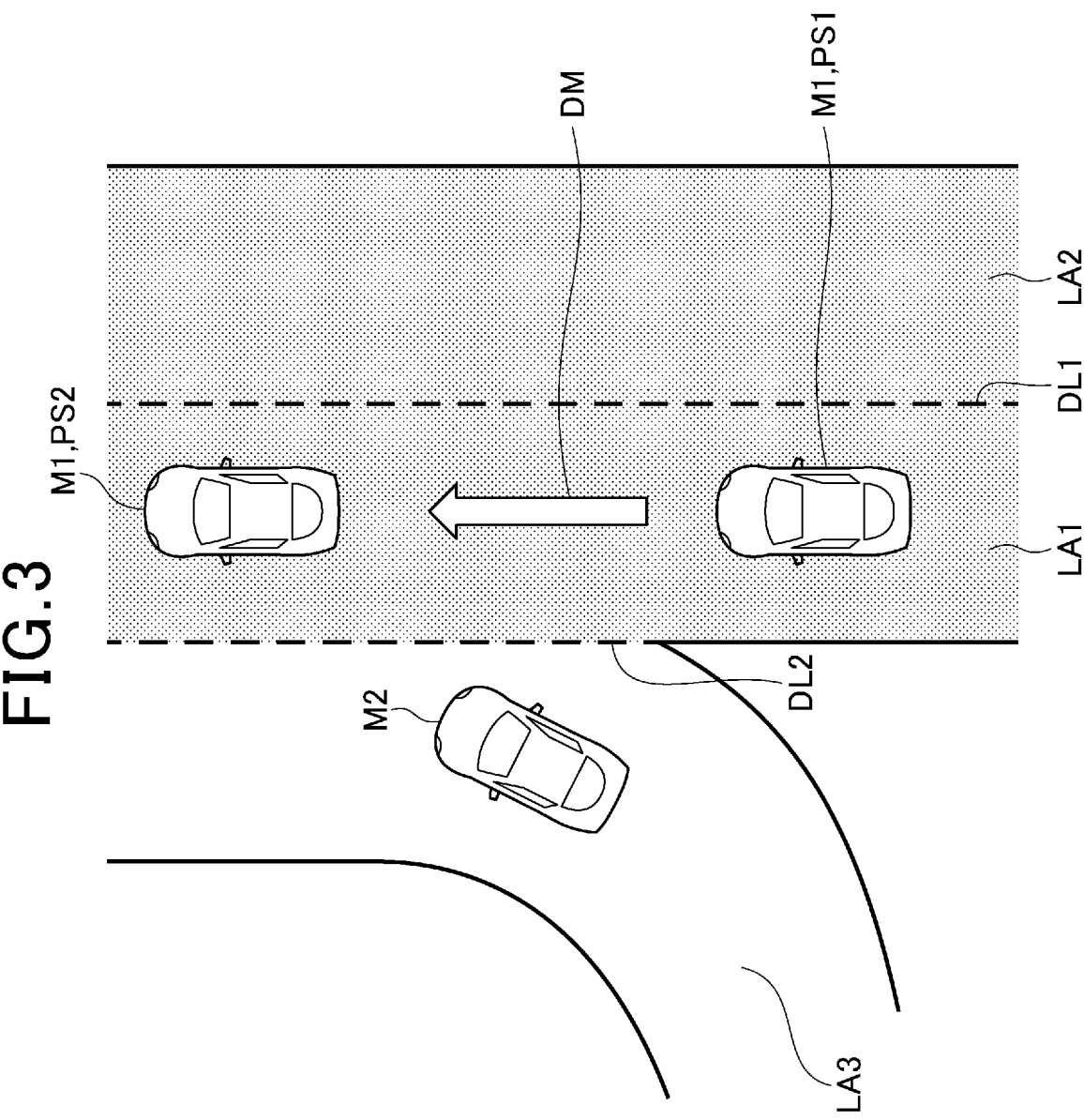
FIG. 3 is a diagram showing an example of a situation in which a narrow angle image is switched to a wide angle image.

FIG. 3 is a diagram showing an example of a situation in which the narrow angle image P21 is switched to the wide angle image P22 by the display control device 1. The narrow angle image P21 indicates a part of the second captured image generated by the second camera 32.

As shown in FIG. 3, the vehicle M1 is traveling from a position PS1 toward a position PS2. The vehicle M1 is traveling in a traveling lane LA1 of two lanes on one side in a freeway. A passing lane LA2 is laid on the right side of the traveling lane LA1. A broken white line DL1 is formed in the boundary between the traveling lane LA1 and the passing lane LA2.

A merging lane LA3 is laid on the left side of the traveling lane LA1. A broken white line DL2 is formed in the boundary between the merging lane LA3 and the traveling lane LA1. The vehicle M2 is about to enter the traveling lane LA1 from the merging lane LA3.

In the situation shown in FIG. 3, the information acquiring unit 12 acquires, based on information indicating a detection result from a distance sensor disposed in the back of the vehicle M1, information indicating that the vehicle M2 traveling behind the vehicle M1 approaches the vehicle M1.

The display control unit 14 determines, according to the information acquired by the information acquiring unit 12, to cause the display 2 to display the wide angle image P22 and switches the narrow angle image P21 displayed on the display 2 to the wide angle image P22.

[2-3. Switching from the Narrow Angle Image to the Wide Angle Image in the First Situation]

Figure 4:
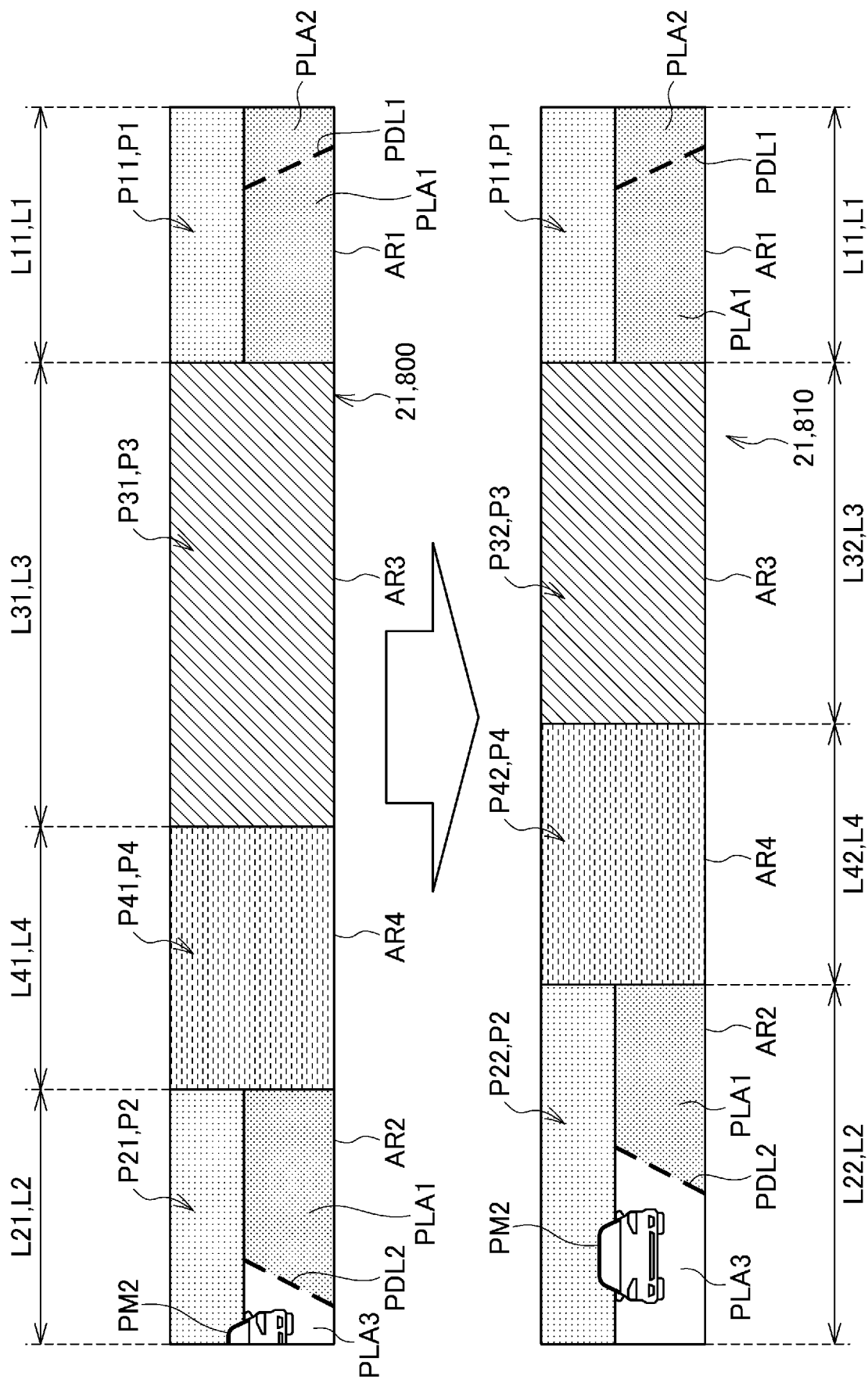
FIG. 4 is a screen diagram showing an example of a change of an image display screen in the switching from the narrow angle image to the wide angle image in the situation shown in FIG. 3.

FIG. 4 is a screen diagram showing an example of a change of an image display screen 800 in the switching from the narrow angle image P21 to the wide angle image P22 in the situation shown in FIG. 3. Each of the image display screen 800 and an image display screen 810 shown in FIG. 4 is displayed on the display surface 21 of the display 2 by the display control unit 14.

The image display screen 800 is an example of a screen on which the display control unit 14 displays the narrow angle image P21. The image display screen 810 is an example of a screen on which the display control unit 14 displays the wide angle image P22.

Each of the image display screen 800 and the image display screen 810 is divided into a first region AR1, a second region AR2, a third region AR3, and a fourth region AR4. The first region AR1, the second region AR2, the third region AR3, and the fourth region AR4 are arrayed in the left-right direction.

The first region AR1 is arranged at the right end portion of each of the image display screen 800 and the image display screen 810. The narrow angle image P11 or the wide angle image P12 is displayed in the first region AR1. That is, the first captured image formed by the first camera 31 is displayed in the first region AR1.

The first region AR1 in which the wide angle image P12 is displayed corresponds to an example of a "first display region". The first region AR1 in which the narrow angle image P11 is displayed corresponds to an example of a "second display region".

The second region AR2 is arranged at the left end portion of each of the image display screen 800 and the image display screen 810. The narrow angle image P21 or the wide angle image P22 is displayed in the second region AR2. That is, the second captured image formed by the second camera 32 is displayed in the second region AR2.

The second region AR2 in which the wide angle image P22 is displayed corresponds to an example of the "first display region". The second region AR2 in which the narrow angle image P21 is displayed corresponds to an example of the "second display region".

The third region AR3 is arranged on a side adjacent to the first region AR1 in a region between the first region AR1 and the second region AR2. An image showing various meters are displayed in the third region AR3. A meter image P3 showing each of, for example, a speed meter, a meter indicating the number of revolutions of an engine, and a meter indicating the residual amount of gasoline is displayed in the third region AR3.

The fourth region AR4 is arranged on a side adjacent to the second region AR2 in the region between the first region AR1 and the second region AR2. At least one of a navigation image and an IVI image is displayed in the fourth region AR4.

In the first embodiment, a navigation image P4 is displayed in the fourth region AR4.

A figure on the upper side of FIG. 4 is a screen image showing the image display screen 800. In the image display screen 800, the narrow angle image P11 and the narrow angle image P21 are displayed on the display surface 21 by the display control unit 14. Specifically, the narrow angle image P11 is displayed in the first region AR1 and the narrow angle image P21 is displayed in the second region AR2. A meter image P31 is displayed in the third region AR3 as an example of the meter image P3. A navigation image P41 is displayed in the fourth region AR4 as an example of the navigation image P4.

Each of the first region AR1 and the second region AR2 in the image display screen 800 corresponds to an example of the "first display region". Each of the meter image P31 and the navigation image P41 corresponds to an example of the "second image".

In the image display screen 800, a size L1 in the lateral direction of the first region AR1 is a first size L11 and a size L2 in the lateral direction of the second region AR2 is a first size L21. In the image display screen 800, a size L3 in the lateral direction of the third region AR3 is a first size L31 and a size L4 in the lateral direction of the fourth region AR4 is a first size L41.

The lateral direction of the first region AR1 and the lateral direction of the second region AR2 correspond to the left-right direction of the display surface 21 in the real space. In other words, the lateral direction of the first region AR1 and the lateral direction of the second region AR2 indicate a direction parallel to a side in the left-right direction among sides defining the periphery of the display surface 21.

Each of the first size L11, the first size L21, the first size L31, and the first size L41 is a default value (or an initial value) of a size in the lateral direction of each of the first region AR1 to the fourth region AR4.

The first size L11 is, for example, 200 mm, the first size L21 is, for example, 200 mm, the first size L31 is, for example, 400 mm, and the first size L41 is, for example, 200 mm.

The narrow angle image P11 is displayed in the first region AR1. A traveling lane image PLA1, a broken white line image PDL1, and a passing lane image PLA2 are displayed on the narrow angle image P11. The traveling lane image PLA1 corresponds to the traveling lane LA1 shown in FIG. 3. The broken white line image PDL1 corresponds to the broken white line DL1 shown in FIG. 3. The passing lane image PLA2 corresponds to the passing lane LA2 shown in FIG. 3.

The narrow angle image P21 is displayed in the second region AR2. The traveling lane image PLA1, a broken white line image PDL2, a merging lane image PLA3, and a vehicle image PM2 are displayed on the narrow angle image P21. The traveling lane image PLA1 corresponds to the traveling lane LA1 shown in FIG. 3. The broken white line image PDL2 corresponds to the broken white line DL2 shown in FIG. 3. The merging lane image PLA3 corresponds to the merging lane LA3 shown in FIG. 3. The vehicle image PM2 corresponds to the vehicle M2 shown in FIG. 3.

In the narrow angle image P21, since an angle of view in the horizontal direction is narrow compared with the wide angle image P22 shown in a figure on the lower side of FIG. 4, a part of the vehicle image PM2 is displayed.

The figure on the lower side of FIG. 4 is a screen diagram showing the image display screen 810. In the image display screen 810, the narrow angle image P11 and the wide angle image P22 are displayed on the display surface 21 by the display control unit 14.

The image display screen 810 is different from the image display screen 800 in that the wide angle image P22 is displayed instead of the narrow angle image P21. The image display screen 810 is different from the image display screen 800 in a size in the lateral direction of each of the second region AR2, the third region AR3, and the fourth region AR4.

The information acquiring unit 12 acquires information indicating that the vehicle M2 traveling behind the vehicle M1 approaches the vehicle M1. The display control unit 14 displays the image display screen 810 on the display 2 according to the information acquired by the information acquiring unit 12.

Specifically, the narrow angle image P11 is displayed in the first region AR1 and the wide angle image P22 is displayed in the second region AR2. A meter image P32 is displayed in the third region AR3. A navigation image P42 is displayed in the fourth region AR4.

The first region AR1 in the image display screen 810 corresponds to an example of the "first display region" and the "second display region". The second display region AR2 in the image display screen 810 corresponds to an example of the "first display region" and the "second display region".

Specifically, when the narrow angle image P11 is displayed in the first region AR1, the first region AR1 corresponds to an example of the "second display region". When the wide angle image P12 is displayed in the first region AR1, the first region AR1 corresponds to an example of the "first display region". When the narrow angle image P21 is displayed in the second region AR2, the second region AR2 corresponds to an example of the "second display region". When the wide angle image P22 is displayed in the second region AR2, the second region AR2 corresponds to an example of the "first display region".

In the image display screen 810, the size L1 in the lateral direction of the first region AR1 is the first size L11 and the size L2 in the lateral direction of the second region AR2 is a second size L22. In the image display screen 800, a size L3 in the lateral direction of the third region AR3 is a second size L32 and a size L4 in the lateral direction of the fourth region AR4 is a second size L42.

The lateral direction of the first region AR1 and the lateral direction of the second region AR2 correspond to the left-right direction of the display surface 21 of the display 2 in the real space.

Since the wide angle image P22 is displayed in the second region AR2, the second size L22 is larger than the first size L21 shown in the image display screen 800. The second size L32 is smaller than the first size L31 shown in the image display screen 800. The second size L42 is smaller than the first size L41 shown in the image display screen 800.

The first size L11 is, for example, 200 mm. The second size L22 is, for example, 250 mm. The second size L32 is, for example, 375 mm. The second size L42 is, for example, 175 mm.

The narrow angle image P11 is displayed in the first region AR1. The narrow angle image P11 is the same as the narrow angle image P11 shown in the image display screen 800.

The wide angle image P22 is displayed in the second region AR2. The traveling lane image PLA1, the broken white line image PDL2, the merging lane image PLA3, and the vehicle image PM2 are displayed on the wide angle image P22. The traveling lane image PLA1 corresponds to the traveling lane LA1 shown in FIG. 3. The broken white line image PDL2 corresponds to the broken white line DL2 shown in FIG. 3. The merging lane image PLA3 corresponds to the merging lane LA3 shown in FIG. 3. The vehicle image PM2 corresponds to the vehicle M2 shown in FIG. 3.

In the wide angle image P22, since an angle of view in the horizontal direction is wide compared with the narrow angle image P21 shown in the figure on the upper side of FIG. 4, the entire vehicle image PM2 is displayed.

The wide angle image P22 is substantially the same in a magnification and reduction rate of the second captured image compared with the narrow angle image P21. In other words, when displaying the wide angle image P22, the display control unit 14 causes the display 2 to display the second captured image such that the magnification and reduction rate of the second captured image is substantially the same compared with when displaying the narrow angle image P21.

That is, the wide angle image P22 is an image in which an image in a region not included in the narrow angle image P21 in the second captured image is displayed on the left side of the narrow angle image P21 at substantially the same magnification and reduction rate as the magnification and reduction rate of the narrow angle image P21. The image in the region not included in the narrow angle image P21 is due to a difference between an angle of view corresponding to the wide angle image P22 and an angle of view corresponding to the narrow angle image P21.

"Substantially the same magnification and reduction rate" indicates that the magnification and reduction rate of the wide angle image P22 is approximately 90% to 110% of the magnification and reduction rate of the narrow angle image P21. Specifically, "substantially the same magnification and reduction rate" indicates that, for example, a ratio of the magnification and reduction rate of the second captured image in the wide angle image P22 and the magnification and reduction rate of the second captured image in the narrow angle image P21 is approximately 90% to 110%.

Since the magnification and reduction rates of the second captured image in the wide angle image P22 and the narrow angle image P21 are substantially the same in this way, when an image displayed in the second region AR2 is switched from the narrow angle image P21 to the wide angle image P22, the user recognizes that a range displayed in the second region AR2 in the second captured image expands in the lateral direction. As a result, it is possible to prevent the user from feeling discomfort.

In FIGS. 3 and 4, as an example of the switching from the narrow angle image P21 to the wide angle image P22, the narrow angle image P21 is switched to the wide angle image P22 when the vehicle M2 traveling behind the vehicle M1 approaches the vehicle M1 in the merging point. However, the embodiments of the present invention are not limited to this.

For example, when the vehicle M1 turns left in an intersection, the display control unit 14 also switches the narrow angle image P21 to the wide angle image P22. In this case, the information acquiring unit 12 acquires information indicating operation to the left direction of the blinkers by the driver. The display control unit 14 determines, according to the information acquired by the information acquiring unit 12, to cause the display 2 to display the wide angle image P22 and switches the narrow angle image P21 displayed on the display 2 to the wide angle image P22.

For example, when the vehicle M2 traveling in the traveling lane approaches the vehicle M1 from the rear left side while the vehicle M1 is traveling in the passing lane, the display control unit 14 also switches the narrow angle image P21 to the wide angle image P22. In this case, the information acquiring unit 12 acquires, based on information indicating a detection result from a distance sensor disposed in the rear left side of the vehicle M1, information indicating that the vehicle M2 traveling on the rear left side of the vehicle M1 approaches the vehicle M1. The display control unit 14 determines, according to the information acquired by the information acquiring unit 12, to cause the display 2 to display the wide angle image P22 and switches the narrow angle image P21 displayed on the display 2 to the wide angle image P22.

In FIGS. 3 and 4, the narrow angle image P21 is switched to the wide angle image P22. However, the embodiments of the present invention are not limited to this. The narrow angle image P11 may be switched to the wide angle image P12. In this case, the size L1 in the lateral direction of the first region AR1 is expanded from the first size L11 to a second size L12. The size L3 in the lateral direction of the third region AR3 is reduced from the first size L31 to the second size L32 and the size L4 in the lateral direction of the fourth region AR4 is reduced from the first size L41 to the second size L42.

Specifically, when the vehicle M1 turns right in an intersection, the display control unit 14 switches the narrow angle image P11 to the wide angle image P12. When the vehicle M2 traveling in the passing lane approaches the vehicle M1 from the rear right side while the vehicle M1 is traveling in the traveling lane, the display control unit 14 also switches the narrow angle image P11 to the wide angle image P12.

[2-4. Second Situation in which the Narrow Angle Image is Switched to the Wide Angle Image]

Figure 5:
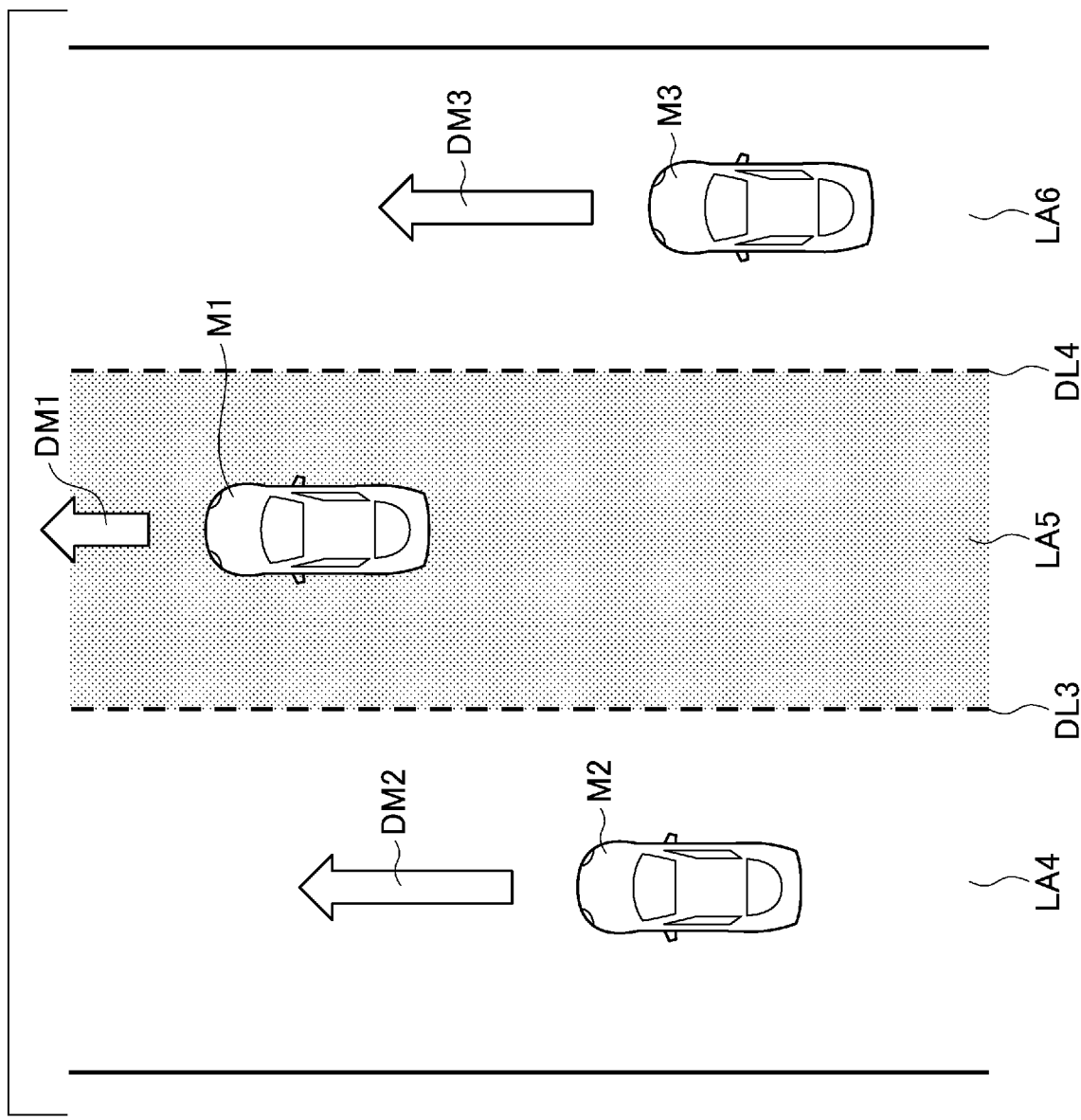
FIG. 5 is a diagram showing an example different from the example shown in FIG. 3 of the situation in which the narrow angle image is switched to the wide angle image.

FIG. 5 is a diagram showing an example different from the example shown in FIG. 3 of the situation in which the narrow angle images P11 and P21 are switched to the wide angle images P12 and P22 by the display control device 1. The narrow angle image P11 indicates a part of the first captured image generated by the first camera 31. The narrow angle image P21 indicates a part of the second captured image generated by the second camera 32.

As shown in FIG. 5, the vehicle M1 is traveling in a direction DM1 in a center lane LA5 among three lanes on one side in a freeway. A passing lane LA6 is laid on the right side of the center lane LA5. A traveling lane LA4 is laid on the left side of the center lane LA5. A broken white line DL3 is formed in the boundary between the traveling lane LA4 and the center lane LA5. A broken white line DL4 is formed in the boundary between the center lane LA5 and the passing lane LA6.

The vehicle M2 is traveling in a direction DM2 in the traveling lane LA4. The direction DM2 indicates the same direction as the direction DM1. The vehicle M3 is traveling in a direction DM3 in the passing lane LA6. The direction DM3 indicates the same direction as the direction DM1. Each of the vehicle M2 and the vehicle M3 is approaching the vehicle M1 from the rear.

In the situation shown in FIG. 5, the information acquiring unit 12 acquires, based on information indicating a detection result from the distance sensor disposed in the back of the vehicle M1, information indicating that the vehicle M3 traveling on the rear right side of the vehicle M1 approaches the vehicle M1.

The display control unit 14 determines, according to the information acquired by the information acquiring unit 12, to cause the display 2 to display the wide angle image P12 and switches the narrow angle image P11 displayed on the display 2 to the wide angle image P12.

The information acquiring unit 12 acquires, based on the information indicating the detection result from the distance sensor disposed in the back of the vehicle M1, information indicating that the vehicle M2 traveling on the rear left side of the vehicle M1 approaches the vehicle M1.

The display control unit 14 determines, according to the information acquired by the information acquiring unit 12, to cause the display 2 to display the wide angle image P22 and switches the narrow angle image P21 displayed on the display 2 to the wide angle image P22.

[2-5. Switching from the Narrow Angle Image to the Wide Angle Image in the Second Situation]

Figure 6:
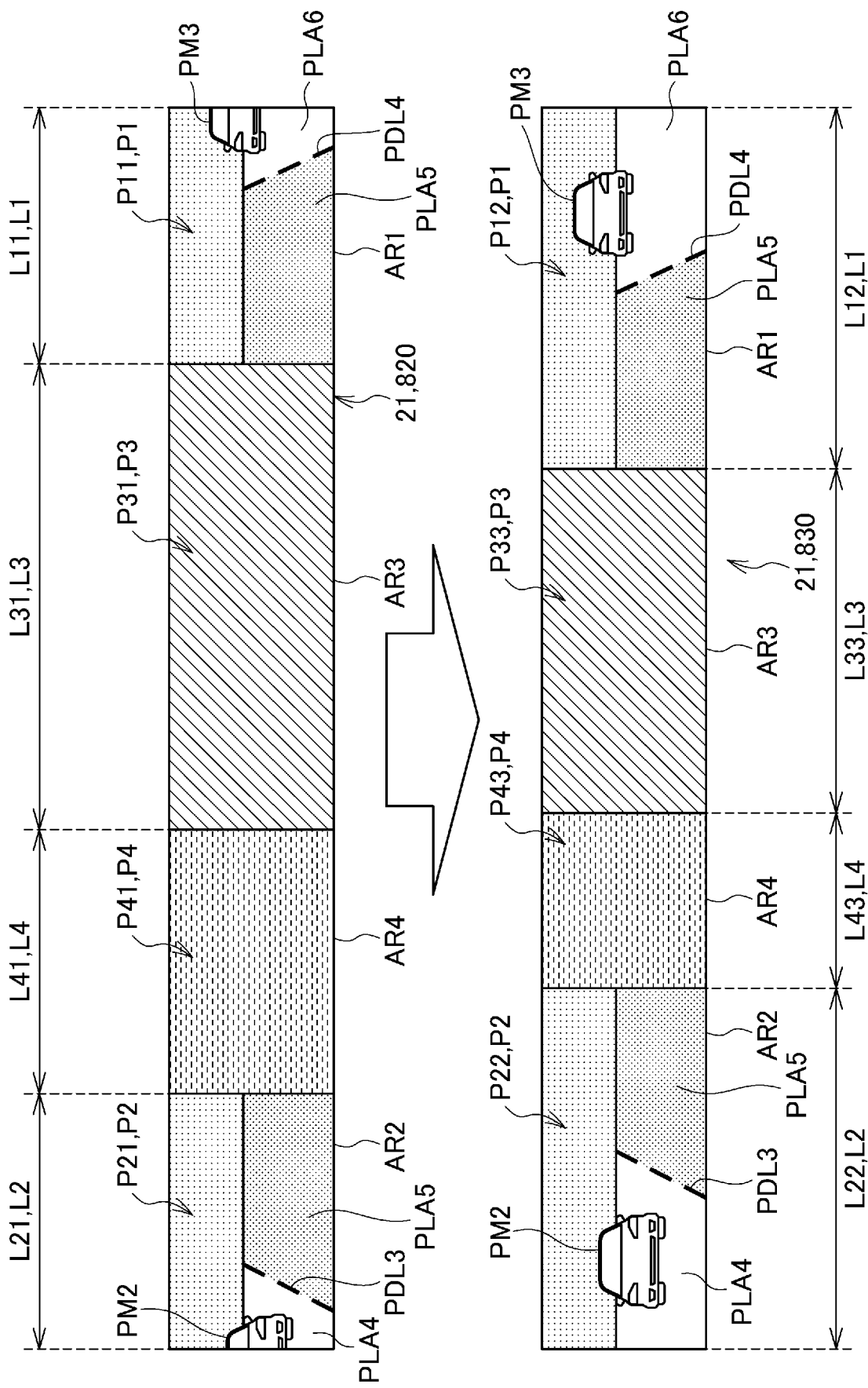
FIG. 6 is a screen diagram showing another example of a change of an image display screen in the switching from the narrow angle image to the wide angle image in the situation shown in FIG. 5.

FIG. 6 is a screen diagram showing an example of a change of an image display screen 830 in the switching from the narrow angle image P11 to the wide angle image P12 and the switching from the narrow angle image P21 to the wide angle image P22 in the situation shown in FIG. 5. Each of the image display screen 820 and the image display screen 830 shown in FIG. 6 is displayed on the display surface 21 of the display 2 by the display control unit 14.

The image display screen 820 is an example of a screen on which the display control unit 14 displays the narrow angle image P11 and the narrow angle image P21. The image display screen 830 is an example of a screen on which the display control unit 14 displays the wide angle image P12 and the wide angle image P22.

A figure on the upper side of FIG. 6 is a screen diagram showing the image display screen 820. The image display screen 820 is different from the image display screen 800 shown in FIG. 4 in the narrow angle image P11 and the narrow angle image P21.

A center lane image PLA5, a passing lane image PLA6, a broken white line image PDL4, and a vehicle image PM3 are displayed on the narrow angle image P11. The center lane image PLA5 corresponds to the center lane LA5 shown in FIG. 5. The passing lane image PLA6 corresponds to the passing lane LA6 shown in FIG. 5. The broken white line image PDL4 corresponds to the broken white line DL4 shown in FIG. 5. The vehicle image PM3 corresponds to the vehicle M3 shown in FIG. 5.

The center lane image PLA5, a broken white line image PDL3, a traveling lane image PLA4, and the vehicle image PM2 are displayed on the narrow angle image P21. The center lane image LA5 corresponds to the center lane LA5 shown in FIG. 5. The broken white line image PDL3 corresponds to the broken white line DL3 shown in FIG. 5. The traveling lane image PLA4 corresponds to the traveling lane LA4 shown in FIG. 5. The vehicle image PM2 corresponds to the vehicle M2 shown in FIG. 5.

Each of the first region AR1 and the second region AR2 in the image display screen 820 corresponds to an example of the "second display region".

A figure on the lower side of FIG. 6 is a screen diagram showing the image display screen 830. In the image display screen 830, the wide angle image P12 and the wide angle image P22 are displayed on the display surface 21 by the display control unit 14.

The image display screen 830 is different from the image display screen 820 in that the wide angle image P12 is displayed instead of the narrow angle image P11 and the wide angle image P22 is displayed instead of the narrow angle image P21. The image display screen 810 is different from the image display screen 820 in a size in the lateral direction of each of the first region AR1 to the fourth region AR4.

The information acquiring unit 12 acquires information indicating that each of the vehicle M2 and the vehicle M3 traveling behind the vehicle M1 approaches the vehicle M1. The display control unit 14 displays the image display screen 830 on the display 2 according to the information acquired by the information acquiring unit 12.

Specifically, the wide angle image P12 is displayed in the first region AR1 and the wide angle image P22 is displayed in the second image AR2. The meter image P32 is displayed in the third region AR3. The navigation image P42 is displayed in the fourth region AR4.

Each of the first region AR1 and the second region AR2 in the image display screen 830 corresponds to an example of the "first display region".

In the image display screen 830, the size L1 in the lateral direction of the first region AR1 is the second size L12 and the size L2 in the lateral direction of the second region AR2 is the second size L22. In the image display screen 800, the size L3 in the lateral direction of the third region AR3 is a third size L33 and the size L4 in the lateral direction of the fourth region AR4 is a third size L43.

The lateral direction of the first region AR1 and the lateral direction of the second region AR2 correspond to the left-right direction of the display surface 21 of the display 2 in the real space.

Since the wide angle image P12 is displayed in the first region AR1, the second size L12 is larger than the first size L11 shown in the image display screen 800. Since the wide angle image P22 is displayed in the second region AR2, the second size L22 is larger than the first size L21 shown in the image display screen 800.

The third size L33 is smaller than the first size L31 shown in the image display screen 800 and the second size L32 shown in the image display screen 810. The third size L43 is smaller than the first size L41 shown in the image display screen 800 and the second size L42 shown in the image display screen 810.

The second size L12 is, for example, 250 mm. The second size L22 is, for example, 250 mm. The third size L33 is, for example, 350 mm. The third size L43 is, for example, 150 mm.

The wide angle image P12 is displayed in the first region AR1. The center lane image PLA5, the broken white line image PDL4, the passing lane image PLA6, and the vehicle image M3 are displayed on the wide angle image P12.

In the wide angle image P12, since an angle of view in the horizontal direction is wide compared with the narrow angle image P11 shown in the figure on the upper side of FIG. 6, the entire vehicle image PM3 is displayed.

In the second region AR2, the traveling lane image PLA4, the broken white line image PDL3, the center lane LA5, and the vehicle image M2 are displayed.

In the wide angle image P22, since an angle of view in the horizontal direction is wide compared with the narrow angle image P21 shown in the figure on the upper side of FIG. 6, the entire vehicle image PM2 is displayed.

The wide angle image P12 is substantially the same in a magnification and reduction rate of the first captured image compared with the narrow angle image P11. In other words, when displaying the wide angle image P12, the display control unit 14 causes the display 2 to display the first captured image such that the magnification and reduction rate of the first captured image is substantially the same compared with when displaying the narrow angle image P11.

That is, the wide angle image P12 is an image in which an image in a region not included in the narrow angle image P11 in the first captured image is displayed on the right side of the narrow angle image P21 at substantially the same magnification and reduction rate as the magnification and reduction rate of the narrow angle image P11. The image in the region not included in the narrow angle image P11 is due to a difference between an angle of view corresponding to the wide angle image P12 and an angle of view corresponding to the narrow angle image P11.

"Substantially the same magnification and reduction rate" indicates that the magnification and reduction rate of the wide angle image P12 is approximately 90% to 110% of the magnification and reduction rate of the narrow angle image P11. Specifically, "substantially the same magnification and reduction rate" indicates that, for example, a ratio of the magnification and reduction rate of the second captured image in the wide angle image P12 and the magnification and reduction rate of the second captured image in the narrow angle image P11 is approximately 90% to 110%.

Since the magnification and reduction rates of the second captured image in the wide angle image P12 and the narrow angle image P11 are substantially the same in this way, when an image displayed in the first region AR1 is switched from the narrow angle image P11 to the wide angle image P12, the user recognizes that a range displayed in the first region AR1 in the first captured image expands in the lateral direction. As a result, it is possible to prevent the user from feeling discomfort.

The wide angle image P22 is substantially the same in a magnification and reduction rate of the second captured image compared with the narrow angle image P21. In other words, when displaying the wide angle image P22, the display control unit 14 causes the display 2 to display the second captured image such that the magnification and reduction rate of the second captured image is substantially the same compared with when displaying the narrow angle image P21.

That is, the wide angle image P22 is an image in which an image in a region not included in the narrow angle image P21 in the second captured image is displayed on the left side of the narrow angle image P21 at substantially the same magnification and reduction rate as the magnification and reduction rate of the narrow angle image P21. The image in the region not included in the narrow angle image P21 is due to a difference between an angle of view corresponding to the wide angle image P22 and an angle of view corresponding to the narrow angle image P21.

Since the magnification and reduction rates of the second captured image in the wide angle image P22 and the narrow angle image P21 are substantially the same in this way, when an image displayed in the second region AR2 is switched from the narrow angle image P21 to the wide angle image P22, the user recognizes that a range displayed in the second region AR2 in the second captured image expands in the lateral direction. As a result, it is possible to prevent the user from feeling discomfort.

In FIGS. 5 and 6, as an example of the switching from the narrow angle image P11 to the wide angle image P12 and the switching from the narrow angle image P21 to the wide angle image P22, the narrow angle image P11 is switched to the wide angle image P12 and the narrow angle image P21 is switched to the wide angle image P22 when the vehicle M2 and the vehicle M3 traveling behind the vehicle M1 approach the vehicle M1. However, the embodiments of the present invention are not limited to this.

For example, when the vehicle M1 temporarily stops, the display control unit 14 also switches the narrow angle image P11 to the wide angle image P12 and switches the narrow angle image P21 to the wide angle image P22. In this case, the information acquiring unit 12 acquires, from the navigation ECU 6, information indicating that the vehicle M1 reaches a temporary stop position. The temporary stop position includes, for example, a position where a sign indicating temporary stop is disposed and a position where the vehicle M1 is obliged to temporarily stop in the Road Traffic Act. The display control unit 14 determines, according to the information acquired by the information acquiring unit 12, to cause the display 2 to display the wide angle image P12 and the wide angle image P22, switches the narrow angle image P11 displayed on the display 2 to the wide angle image P12, and switches the narrow angle image P21 displayed on the display 2 to the wide angle image P22.

In the first embodiment, the image display screen includes the first region AR1 and the second region AR2. However, the embodiments of the present invention are not limited to this. The image display screen only has to include at least one of the first region AR1 and the second region AR2. For example, the image display screen may include the first region AR1 and may not include the second region AR2. Specifically, the image display screen may be divided into three regions, that is, the first region AR1, the third region AR3, and the fourth region AR4. For example, the image display screen may include the second region AR2 and may not include the first region AR1. Specifically, the image display screen may be divided into three regions, that is, the second region AR2, the third region AR3, and the fourth region AR4.

In the first embodiment, the image display screen is divided into the first region AR1, the second region AR2, the third region AR3, and the fourth region AR4. However, the embodiments of the present invention are not limited to this. The image display screen may be divided into the first region AR1, the second region AR2, and the third region AR3 or the fourth region AR4. Specifically, the image display screen may be divided into three regions, that is, the first region AR1, the second region AR2, and the third region AR3. The image display screen may be divided into three regions, that is, the first region AR1, the second region AR2, and the fourth region AR4. In this case, the third region AR3 or the fourth region AR4 is disposed between the first region AR1 and the second region AR2.

In the first embodiment, the meter image P3 is displayed in the third region AR3 and the navigation image P4 is displayed in the fourth region AR4. However, the embodiments of the present invention are not limited to this. Any one of the meter image P3, the navigation image P4, and the IVI image only has to be displayed in each of the third region AR3 and the fourth region AR4.

[2-6. Processing of the Display Control Device]

Figure 7:
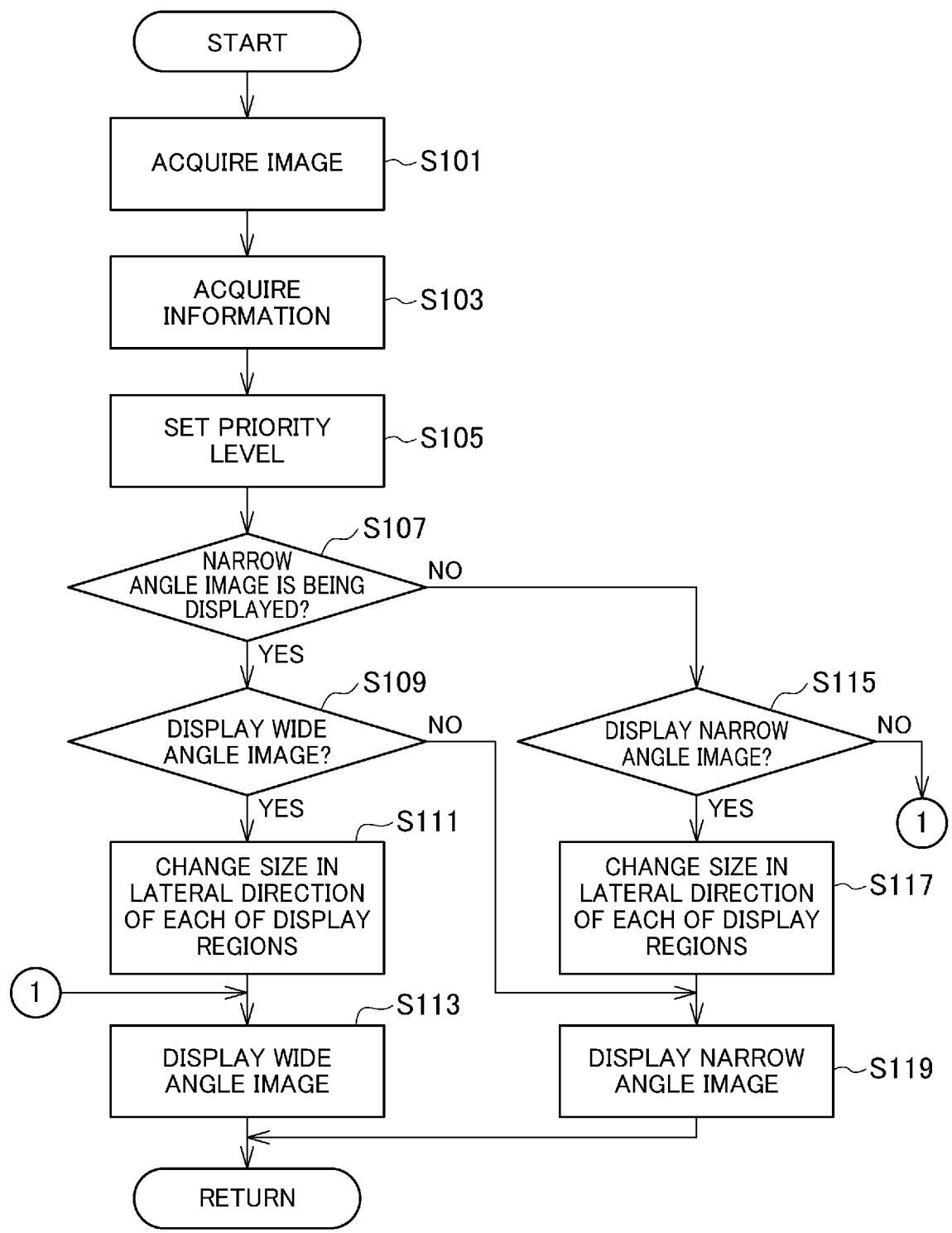
FIG. 7 is a flowchart showing an example of processing of a display control device.

FIG. 7 is a flowchart showing an example of processing of the display control device 1.

Processing concerning the first captured image of the display control device 1 is explained with reference to FIG.

7. The display control device 1 executes, concerning the second captured image, the same processing as the processing shown in FIG. 7.

First, in step S101, the image acquiring unit 11 acquires a captured image from the camera 3. Specifically, the image acquiring unit 11 acquires a first captured image from the first camera 31.

Subsequently, in step S103, the information acquiring unit 12 acquires, from the detecting mechanism 4, the communication device 5, and the navigation ECU 6, information concerning operation of the vehicle M1, information concerning the vehicles M2 and M3 around the vehicle M1, and information concerning a road on which the vehicle M1 travels.

Subsequently, in step S105, the setting unit 13 sets a priority degree for each of the kinds of information acquired by the information acquiring unit 12.

Subsequently, in step S107, the display control unit 14 determines whether the narrow angle image P11 is being displayed.

When the display control unit 14 determines that the narrow angle image P11 is not being displayed, that is, the wide angle image P22 is being displayed (NO in step S107), the processing proceeds to step S115. When the display control unit 14 determines that the narrow angle image P11 is being displayed (YES in step S107), the processing proceeds to step S109.

In step S109, the display control unit 14 determines whether to cause the display 2 to display the wide angle image P12.

When the display control unit 14 determines to cause the display 2 not to display the wide angle image P12, that is, to display the narrow angle image P11 (NO in step S109), the processing proceeds to step S119. When the display control unit 14 determines to cause the display 2 to display the wide angle image P12 (YES in step S109), the processing proceeds to step S111.

In step S111, the display control unit 14 changes the size in the lateral direction of each of the first region AR1, the third region AR3, and the fourth region AR4. That is, the display control unit 14 changes the size L1 in the lateral direction of the first region AR1 from the first size L11 to the second size L12 and changes the size in the lateral direction of each of the third region AR3 and the fourth region AR4 according to the change of the size L1.

Subsequently, in step S113, the display control unit 14 displays the wide angle image P12 in the first region AR1. Thereafter, the processing returns to step S101.

When determining that the narrow angle image P11 is not being displayed, that is, the wide angle image P22 is being displayed (NO in step S107), in step S115, the display control unit 14 determines whether to cause the display 2 to display the narrow angle image P11.

When the display control unit 14 determines to cause the display 2 not to display the narrow angle image P11, that is, to display the wide angle image P12 (NO in step S115), the processing proceeds to step S113. When the display control unit 14 determines to cause the display 2 to display the narrow angle image P11 (YES in step S115), the processing proceeds to step S117.

In step S117, the display control unit 14 changes the size in the lateral direction of each of the first region AR1, the third region AR3, and the fourth region AR4. That is, the display control unit 14 changes the size L1 in the lateral direction of the first region AR1 from the second size L12 to the first size L11 and changes the size in the lateral direction of each of the third region AR3 and the fourth region AR4 according to the change of the size L1.

Subsequently, in step S119, the display control unit 14 displays the narrow angle image P11 in the first region AR1. Thereafter, the processing returns to step S101.

Step S101 corresponds to an example of an "image acquiring step". Step S103 corresponds to an example of an "information acquiring step". Step S105 corresponds to an example of a "setting step". Steps S107 to S119 correspond to an example of a "display control step".

3. Second Embodiment

[3-1. Disposition of a Display Control System]

FIG. 8 is a diagram showing an example of disposition of equipment around a driver's seat in the vehicle M1 on which the display control system 100 according to a second embodiment is mounted.

In the following explanation, the vehicle M1 may be described as vehicle 7.

The display control system 100 shown in FIG. 8 is different from the display control system 100 shown in FIG. 2 in that the display 2 includes a first display 2A, a second display 2B, and a third display 2C. Note that, in the display control system 100 according to the second embodiment, each of various meters is disposed in the vehicle 7 as hardware. A display on which an image showing the various meters is displayed may be disposed in the vehicle 7.

The first display 2A is disposed at the right end portion of the upper surface of the dashboard 74. The first display 2A includes a display surface 21A. A first captured image generated by the first camera 31 is displayed on the display surface 21A of the first display 2A. Specifically, the narrow angle image P11 or the wide angle image P12 is displayed on the display surface 21A of the first display 2A by the display control device 1. The first display 2A corresponds to an example of the "first display device".

The second display 2B is disposed on the left end portion of the upper surface of the dashboard 74. The second display 2B includes a display surface 21B. A second captured image generated by the second camera 32 is displayed on the display surface 21B of the second display 2B. Specifically, the narrow angle image P21 or the wide angle image P22 is displayed on the display surface 21B of the second display 2B by the display control device 1. The second display 2B corresponds to an example of the "second display device".

The third display 2C is disposed in the center in the left-right direction of the dashboard 74. The third display 2C includes a display surface 21C. At least one of a navigation image and an IVI image is displayed on the display surface 21C of the third display 2C by the display control device 1.

[3-2. Switching from the Narrow Angle Image to the Wide Angle Image in the First Situation]

FIG. 9 is a screen diagram showing an example of a change of image display screens 900 and 910 in switching from the narrow angle image P21 to the wide angle image P22 in the situation shown in FIG. 3.

Each of the image display screen 910 and an image display screen 930 shown in FIG. 9 is displayed on the display surface 21A of the first display 2A by the display control unit 14.

Each of the image display screen 900 and an image display screen 920 shown in FIG. 9 is displayed on the display surface 21B of the second display 2B by the display control unit 14.

A figure on the upper side of FIG. 9 is a screen diagram showing the image display screen 900 and the image display screen 910. In the image display screen 900, the narrow angle image P21 and an image display region ARB are displayed on the display surface 21B by the display control unit 14. A part of the IVI image is displayed in the image display region ARB. Other images may be displayed in the image display region ARB. For example, an image showing time, an image showing temperature, and the like may be displayed in the image display region ARB. An image may not be displayed in the image display region ARB.

The narrow angle image P21 corresponds to an example of the "third image". A region where the narrow angle image P21 is displayed in the display surface 21B corresponds to an example of a "fourth display region".

The narrow angle image P21 includes the traveling lane image PLA1, the broken white line image PDL2, the merging lane image PLA3, and the vehicle image PM2. The traveling lane image PLA1 corresponds to the traveling lane LA1 shown in FIG. 3. The broken white line image PDL2 corresponds to the broken white line DL2 shown in FIG. 3. The merging lane image PLA3 corresponds to the merging lane LA3 shown in FIG. 3. The vehicle image PM2 corresponds to the vehicle M2 shown in FIG. 3.

In the image display screen 910, the narrow angle image P11 and an image display region ARA are displayed on the display surface 21A by the display control unit 14. A part of the IVI image is displayed in the image display region ARA. Note that other images may be displayed in the image display region ARA. For example, an image showing time, an image showing temperature, and the like may be displayed in the image display region ARA. An image may not be displayed in the image display region ARA.

The narrow angle image P11 corresponds to an example of the "first image". A region where the narrow angle image P11 is displayed in the display surface 21A corresponds to an example of the "second display region". When the wide angle image P12 is displayed on the display surface 21A, a region where the wide angle image P12 is displayed in the display surface 21A corresponds to an example of the "first display region".

The narrow angle image P11 includes the traveling lane image PLA1, the broken white line image PDL1, and the passing lane image PLA2. The traveling lane image PLA1 corresponds to the traveling lane LA1 shown in FIG. 3. The broken white line image PDL1 corresponds to the broken white line DL1 shown in FIG. 3. The passing lane image PLA2 corresponds to the passing lane LA2 shown in FIG. 3.

In the image display screen 900, a size LB in the lateral direction of the narrow angle image P21 is a first size LB1. In the image display screen 910, a size LA in the lateral direction of the narrow angle image P11 is a first size LA1. Each of the first size LB1 and the first size LA1 is, for example, 200 mm. Note that a size in the lateral direction of the display surface 21B and the display surface 21A is, for example, 250 mm.

A figure on the lower side of FIG. 9 is a screen diagram showing the image display screen 920 and the image display screen 930. In the image display screen 920, the wide angle image P22 is displayed on the display surface 21B by the display control unit 14. The wide angle image P22 corresponds to an example of the "third image". A region where the wide angle image P22 is displayed in the display surface 21B corresponds to an example of a "third display region".

The wide angle image P22 includes the traveling lane image PLA1, the broken white line image PDL2, the merging lane image PLA3, and the vehicle image PM2.

In the wide angle image P22, since an angle of view in the horizontal direction is wide compared with the narrow angle image P21 shown in the figure on the upper side of FIG. 9, the entire vehicle image PM2 is displayed.

In the image display screen 920, the size LB in the lateral direction of the wide angle image P22 is a second size LB2. The second size LB2 is, for example, 250 mm. That is, the wide angle image P22 is displayed on the entire display surface 21B.

The wide angle image P22 is substantially the same in the magnification and reduction rate of the second captured image compared with the narrow angle image P21. In other words, when displaying the wide angle image P22, the display control unit 14 causes the display 2 to display the second captured image such that the magnification and reduction rate of the second captured image is substantially the same compared with when displaying the narrow angle image P21.

That is, the wide angle image P22 is an image in which an image in a region not included in the narrow angle image P21 in the second captured image is displayed on the left side of the narrow angle image P21 at substantially the same magnification and reduction rate as the magnification and reduction rate of the narrow angle image P21. The image in the region not included in the narrow angle image P21 is due to a difference between an angle of view corresponding to the wide angle image P22 and an angle of view corresponding to the narrow angle image P21.

Since the magnification and reduction rates of the second captured image in the wide angle image P22 and the narrow angle image P21 are substantially the same in this way, when an image displayed in the second region AR2 is switched from the narrow angle image P21 to the wide angle image P22, the user recognizes that a range displayed in the second region AR2 in the second captured image expands in the lateral direction. As a result, it is possible to prevent the user from feeling discomfort.

In the image display screen 930, as in the image display screen 910, the narrow angle image P11 and the image display region ARA are displayed on the display surface 21A by the display control unit 14.

[4. Configuration and Effects of the Display Control Device]

In the following explanation, for convenience, the display control unit 14 causes the display 2 to display one of the narrow angle image P11 and the wide angle image P12 indicating a part of the first captured image. In other words, explanation is omitted when the display control unit 14 causes the display 2 to display one of the narrow angle image P21 and the wide angle image P22 indicating a part of the second captured image.

As explained with reference to the drawings, the embodiments of the present invention include the first embodiment and the second embodiment.

The display control device 1 according to the embodiments of the present invention is the display control device 1 mounted on the vehicle M1 in which the camera 3 and the display 2 are mounted, the camera photographing a first captured image indicating an image on a rear right side of the vehicle M1 and the display 2 displaying the first captured image, the display control device 1 including the image acquiring unit 11 that acquires the first captured image from the camera 3 and the display control unit 14 that controls the first captured image displayed on the display 2. The display control unit 14 causes the display 2 to display one of the narrow angle image P11 indicating a part of the first captured image and the wide angle image P12 indicating an image in a range wider than the narrow angle image P11 in the first captured image and causes the display 2 to display the first captured image such that a size of the first region AR1 in displaying the wide angle image P12 is large compared with a size of the first region AR1 in displaying the narrow angle image P11.

With this configuration, the display control unit 14 causes the display 2 to display the first captured image such that the size of the first region AR1 in displaying the wide angle image P12 is large compared with the size of the first region AR1 in displaying the narrow angle image P11. Therefore, when the narrow angle image P11 is switched to the wide angle image P12, it is possible to display the first captured image without causing visual discomfort for the user.

For example, since the first region AR1 is expanded in the lateral direction when the narrow angle image P11 is switched to the wide angle image P12, the user recognizes that a range displayed in the first region AR1 in the first captured image is laterally expanded. As a result, it is possible to prevent the user from feeling discomfort.

In the display control device 1, a size in the lateral direction of the first region AR1 in displaying the wide angle image P12 is large compared with a size in the lateral direction of the first region AR1 in displaying the narrow angle image P11. The lateral direction corresponds to the left-right direction of the display surface 21 of the display 2 in the real space.

With this configuration, since the first region AR1 is expanded in the lateral direction when the narrow angle image P11 is switched to the wide angle image P12, when the narrow angle image P11 is switched to the wide angle image P12, the user recognizes that a region displayed in the first region AR1 in the first captured image is laterally expanded. Therefore, when the narrow angle image P11 is switched to the wide angle image P12, it is possible to display the first captured image without causing visual discomfort for the user.

In the display control device 1, when displaying the wide angle image P12, the display control unit 14 causes the display 2 to display the first captured image such that the magnification and reduction rate of the first captured image is substantially the same compared with when displaying the narrow angle image P11.

With this configuration, since the magnification and reduction rates of the first captured image in the wide angle image P12 and the narrow angle image P11 are substantially the same, when the narrow angle image P11 is switched to the wide angle image P12, the user recognizes that a region displayed in the first region AR1 in the first captured image is laterally expanded. As a result, it is possible to prevent the user from feeling discomfort.

In the display control device 1, the display control unit 14 causes the display 2 to display the first captured image and the meter image P31 and the navigation image P41 displayed in a position adjacent to the first captured image in the display 2 and causes the display 2 to display the meter image P3 and the navigation image P4 such that, when displaying the wide angle image P12 on the display 2, sizes of the third region AR3 for displaying the meter image P31 and the fourth region AR4 for displaying the navigation image P4 are small compared with when displaying the narrow angle image P11 on the display 2.

With this configuration, when displaying the wide angle image P12 on the display 2, the display control unit 14 causes the display 2 to display the meter image P3 and the navigation image P4 such that sizes of the third region AR3 and the fourth region AR4 are small compared with when displaying the narrow angle image P11 on the display 2.

Therefore, the meter image P3 and the navigation image P4 can be displayed even when the wide angle image P12 is displayed.

In the display control device 1, the display control device 1 further includes the information acquiring unit 12 that acquires information concerning operation of the vehicle M1, information concerning the vehicle M2 around the vehicle M1, and information concerning a road on which the vehicle M1 travels, and the display control unit 14 determines, according to the information acquired by the information acquiring unit 12, whether to cause the display 2 to display the narrow angle image P11 or cause the display 2 to display the wide angle image P12.

With this configuration, the display control unit 14 determines, according to the information concerning the operation of the vehicle M1, the information concerning the vehicle M2 around the vehicle M1, and the information concerning the road on which the vehicle M1 travels, whether to cause the display 2 to display the narrow angle image P11 or cause the display 2 to display the wide angle image P12. Therefore, it is possible to properly determine whether to cause the display 2 to display the narrow angle image P11 or cause the display 2 to display the wide angle image P12.

In the display control device 1, the information concerning the operation of the vehicle M1 includes information indicating an operation direction of blinkers mounted on the vehicle M1, the information concerning the vehicle M2 around the vehicle M1 includes information indicating that the vehicle M2 traveling behind the vehicle M1 approaches the vehicle M1, and the information concerning the road includes information indicating a merging point of the road.

With this configuration, it is possible to properly determine whether to cause the display 2 to display the narrow angle image P11 or cause the display 2 to display the wide angle image P12.

In the display control device 1, the display control device 1 further includes the setting unit 13 that sets a priority level for each of the kinds of information acquired by the information acquiring unit 12, and the display control unit 14 controls, according to the priority level, the first captured image displayed on the display 2.

With this configuration, the priority level is set for each of the kinds of information acquired by the information acquiring unit 12. The display control unit 14 controls the first captured image displayed on the display 2 according to the priority level. Therefore, when the information acquiring unit 12 acquires a plurality of kinds of information, it is possible to properly control, according to the priority level, the first captured image displayed on the display 2.

In the display control device 1, the first display 2A and the second display 2B are mounted on the vehicle M1, the camera 3 images the rear right side of the vehicle M1 to capture the first captured image and images the rear left side of the vehicle M1 to capture a second captured image, the image acquiring unit 11 acquires the first captured image and the second captured image from the camera 3, and the display control unit 14 controls the second captured image displayed on the second display 2B, causes the second display 2B to display one of the narrow angle image P21 indicating a part of the second captured image and the wide angle image P22 indicating an image in a wider range than the narrow angle image P21 in the second captured image, and causes the second display 2B to display the second captured image such that a size of a region for displaying the wide angle image P22 is large compared with a size of a region for displaying the narrow angle image P21.

With this configuration, the display control unit 14 causes the second display 2B to display the second captured image such that a size of the region for displaying the wide angle image P22 is large compared with a size of the region for displaying the narrow angle image P21. Therefore, when the narrow angle image P21 is switched to the wide angle image P22, it is possible to display the second captured image without causing visual discomfort for the user.

For example, since a region where an image is displayed is expanded in the lateral direction when the narrow angle image P21 is switched to the wide angle image P22, the user recognizes that a range displayed in the region in the second captured image is laterally expanded. As a result, it is possible to prevent the user from feeling discomfort.

A display control method according to the embodiments of the present invention is a display control method for the display control device 1 mounted on the vehicle M1 in which the camera 3 and the display 2 are mounted, the camera 3 photographing a first captured image indicating an image on a rear right side of the vehicle M1 and the display 2 displaying the first captured image, the display control method including an image acquiring step in which the display control device 1 acquires the first captured image from the camera 3 and a display control step in which the display control device 1 controls the first captured image displayed on the display 2. In the display control step, the display control device 1 causes the display 2 to display one of the narrow angle image P11 indicating a part of the first captured image and the wide angle image P12 indicating an image in a range wider than the narrow angle image P11 in the first captured image and causes the display 2 to display the first captured image such that a size of the first region AR1 in displaying the wide angle image P12 is large compared with a size of the first region AR1 in displaying the narrow angle image P11.

With this configuration, the display control device 1 causes the display 2 to display the first captured image such that the size of the first region AR1 in displaying the wide angle image P12 is large compared with the size of the first region AR1 in displaying the narrow angle image P11. Therefore, when the narrow angle image P11 is switched to the wide angle image P12, it is possible to display the first captured image without causing visual discomfort for the user.

For example, since the first region AR1 is expanded in the lateral direction when the narrow angle image P11 is switched to the wide angle image P12, the user recognizes that a range displayed in the first region AR1 in the first captured image is laterally expanded. As a result, it is possible to prevent the user from feeling discomfort.

In the display control method, a size in the lateral direction of the first region AR1 in displaying the wide angle image P12 is large compared with a size in the lateral direction of the first region AR1 in displaying the narrow angle image P11. The lateral direction corresponds to the left-right direction of the display surface 21 of the display 2 in the real space.

With this configuration, since the first region AR1 is expanded in the lateral direction when the narrow angle image P11 is switched to the wide angle image P12, when the narrow angle image P11 is switched to the wide angle image P12, the user recognizes that a region displayed in the first region AR1 in the first captured image is laterally expanded. Therefore, when the narrow angle image P11 is switched to the wide angle image P12, it is possible to display the first captured image without causing visual discomfort for the user.

In the display control method, in the display control step, when displaying the wide angle image P12, the display control device 1 causes the display 2 to display the first captured image such that the magnification and reduction rate of the first captured image is substantially the same compared with when displaying the narrow angle image P11.

With this configuration, since the magnification and reduction rates of the first captured image in the wide angle image P12 and the narrow angle image P11 are substantially the same, when the narrow angle image P11 is switched to the wide angle image P12, the user recognizes that a region displayed in the first region AR1 in the first captured image is laterally expanded. As a result, it is possible to prevent the user from feeling discomfort.

In the display control method, in the display control step, the display control device 1 causes the display 2 to display the first captured image and the meter image P31 and the navigation image P41 displayed in a position adjacent to the first captured image in the display 2 and causes the display 2 to display the meter image P3 and the navigation image P4 such that, when displaying the wide angle image P12 on the display 2, sizes of the third region AR3 for displaying the meter image P31 and the fourth region AR4 for displaying the navigation image P4 are small compared with when displaying the narrow angle image P11 on the display 2.

With this configuration, when displaying the wide angle image P12 on the display 2, the display control device 1 causes the display 2 to display the meter image P3 and the navigation image P4 such that sizes of the third region AR3 and the fourth region AR4 are small compared with when displaying the narrow angle image P11 on the display 2. Therefore, the meter image P3 and the navigation image P4 can be displayed even when the wide angle image P12 is displayed.

In the display control method, the display control method further includes an information acquiring step in which the display control device 1 acquires information concerning operation of the vehicle M1, information concerning the vehicle M2 around the vehicle M1, and information concerning a road on which the vehicle M1 travels, and, in the display control step, the display control device 1 determines, according to the information acquired in the information acquiring step, whether to cause the display 2 to display the narrow angle image P11 or cause the display 2 to display the wide angle image P12.

With this configuration, the display control device 1 determines, according to the information concerning the operation of the vehicle M1, the information concerning the vehicle M2 around the vehicle M1, and the information concerning the road on which the vehicle M1 travels, whether to cause the display 2 to display the narrow angle image P11 or cause the display 2 to display the wide angle image P12. Therefore, it is possible to properly determine whether to cause the display 2 to display the narrow angle image P11 or cause the display 2 to display the wide angle image P12.

In the display control method, the display control method further includes a setting step in which the display control device 1 sets a priority level for each of the kinds of information acquired in the information acquiring step, and, in the display control step, the display control device 1 controls, according to the priority level, the first captured image displayed on the display 2.

With this configuration, the priority level is set for each of the kinds of information acquired in the information acquiring step. The display control device 1 controls the first captured image displayed on the display 2, according to the priority level. Therefore, when a plurality of kinds of information are acquired in the information acquiring step, it is possible to properly control, according to the priority level, the first captured image displayed on the display 2.

In the display control method, the first display 2A and the second display 2B are mounted on the vehicle M1, the camera 3 images the rear right side of the vehicle M1 to capture the first captured image and images the rear left side of the vehicle M1 to capture a second captured image, in the image acquiring step, the display control device 1 acquires the first captured image and the second captured image from the camera 3, and, in the display control step, the display control device 1 controls the second captured image displayed on the second display 2B, causes the second display 2B to display one of the narrow angle image P21 indicating a part of the second captured image and the wide angle image P22 indicating an image in a wider range than the narrow angle image P21 in the second captured image, and causes the second display 2B to display the second captured image such that a size of a region for displaying the wide angle image P22 is large compared with a size of a region for displaying the narrow angle image P21.

With this configuration, the display control device 1 causes the second display 2B to display the second captured image such that a size of the region for displaying the wide angle image P22 is large compared with a size of the region for displaying the narrow angle image P21. Therefore, when the narrow angle image P21 is switched to the wide angle image P22, it is possible to display the second captured image without causing visual discomfort for the user.

For example, since a region where an image is displayed is expanded in the lateral direction when the narrow angle image P21 is switched to the wide angle image P22, the user recognizes that a range displayed in the region in the second captured image is laterally expanded. As a result, it is possible to prevent the user from feeling discomfort.

[5. Other Embodiments of the Display Control Device 1]

The first embodiment and the second embodiment explained above only indicate aspects of the present invention and can be optionally modified and applied in a range not departing from the gist of the present invention.

In the first embodiment and the second embodiment, the display control device 1 is configured as the ECU. However, the embodiments of the present invention are not limited to this. The display control device 1 only has to include the memory 1A and the processor 1B. For example, the display control device 1 may be configured as a personal computer.

In the first embodiment and the second embodiment, the control program is stored in the memory 1A. However, the embodiments of the present invention are not limited to this. For example, the control program may be downloaded from a network to the memory 1A via the communication device 5 and, thereafter, executed by the processor 1B. For example, the control program may be loaded to the memory 1A from a storage medium connected to the display control device 1.

FIG. 1 is a schematic diagram in which the functional components of the display control system 100 and the display control device 1 are classified according to main processing contents and shown for ease of understanding the present invention. The components of each of the display control system 100 and the display control device 1 can also be classified into a larger number of components according to the processing contents. The components can also be classified such that one component executes more processing. The processing of the components may be executed by one hardware or may be executed by a plurality of kinds of hardware. The processing of the components may be realized by one program or may be realized by a plurality of programs.

The processes of the flowchart shown in FIG. 7 are divided according to main processing contents for ease of understanding the processing of the display control device 1. The present invention is not limited by methods of the division and names of the processes. The processing of the display control device 1 can also be divided into more processes according to the processing contents. The processes can also be divided such that one process include more processing. The processing order of the flowchart is not limited to the illustrated example.

In the first embodiment, the display control device 1 causes the display 2 to display the first captured image and the second captured image. However, the embodiments of the present invention are not limited to this. The display control device 1 only has to cause the display 2 to display at least one of the first captured image and the second captured image. For example, the display control device 1 may display the first captured image and may not display the second captured image on the display 2. For example, the display control device 1 may display the second captured image and may not display the first captured image on the display 2.

REFERENCE SIGNS LIST

100 display control system
1 display control device
1A memory
1B processor
2 display (first display device)
2A first display (first display device)
21A display surface (first display region, second display region)
2B second display (second display device)
21B display surface (third display region, fourth display region)
2C third display
21, 21A, 21B, 21C display surface
3 camera
31 first camera
32 second camera
4 detecting mechanism
5 communication device
6 navigation ECU
7 vehicle
71 steering wheel
72 selector
73 camera supporting body
731 right side supporting body
732 left side supporting body
74 dashboard
800, 810, 820, 830 image display screen
900, 910, 920, 930 image display screen
AR1 first region (first display region, second display region)
AR2 second region (first display region, second display region)
AR3 third region
AR4 fourth region
L1, L2, L3, L4 size
L11, L21, L31, L41 first size
L12, L22, L32, L42 second size
LA, LB size
LA1, LB1 first size LB2 second size
L33, L43 third size
M1, M2, M3 vehicle
P11, P21 narrow angle image (first image)
P12 wide angle image (first image, first captured image)
P22 wide angle image (first image, third image, second captured image)
P3, P31, P32 meter image (second image)
P4, P41, P42 navigation image (second image)

What is claimed is:

1. A display control system mounted on a first vehicle comprising:
 a camera photographing a first image indicating at least one of images having an angle of view in a horizontal direction on a rear right side and a rear left side of the first vehicle;
 a first display disposed on a dashboard along a left-right direction of the first vehicle, wherein the first display displays the first image and a second image which is displayed in a position adjacent to the first image and indicates various images other than the first image from the camera, and wherein, in the first image, the first display displays one of a narrow angle image and a wide angle image having an angle of view in the horizontal direction wider than an angle of view of the narrow angle image; and
 a display control device including a processor and a memory,
 wherein the processor includes
 an image acquiring unit that acquires the first image from the camera, and
 a display control unit that controls to switch between the wide angle image and the narrow angle image of the first image displayed on the first display,
 wherein a width length of the first image in the left-right direction is changed depending on a case of displaying the wide angle image or a case of displaying the narrow angle image, and
 when displaying the wide angle image of the first image in the first display, the display control unit controls to expand the width length of the first image toward the second image and make a width length of the second image smaller than the width length of the second image when displaying the narrow angle image of the first image, so that the first image does not overlap with the second image in the first display.

2. The display control system according to claim 1, wherein, when displaying the wide angle image of the first image, the display control unit causes the first display to display the first image such that a magnification and reduction rate of the first image is substantially same compared with when displaying the narrow angle image.

3. The display control system according to claim 1, further comprising an information acquiring unit that acquires each of information concerning operation of the first vehicle, information concerning a second vehicle around the first vehicle, and information concerning a road on which the first vehicle travels, wherein
 the display control unit determines, according to the information acquired by the information acquiring unit, whether to cause the first display to display the narrow angle image or cause the first display to display the wide angle image.

4. The display control system according to claim 3, wherein
 the information concerning the operation of the first vehicle includes information indicating an operation direction of blinkers mounted on the first vehicle,
 the information concerning the second vehicle around the first vehicle includes information indicating that the second vehicle approaches the first vehicle, and
 the information concerning the road includes information indicating a merging point of the road.

5. The display control system according to claim 3, further comprising a setting unit that sets a priority level for each of the kinds of information acquired by the information acquiring unit, wherein
 the display control unit controls, according to the priority level, the first image displayed on the first display.

6. The display control system according to claim 1, wherein a second display is mounted on the first vehicle, the camera images the rear right side of the first vehicle to capture the first image and images the rear left side of the first vehicle to capture a third image, the image acquiring unit acquires the first image and the third image from the camera, wherein, in the third image, the second display displays one of a narrow angle image and a wide angle image having an angle of view in the horizontal direction wider than an angle of view of the narrow angle image, the display control unit controls the third image displayed on the second display to switch between the wide angle image and the narrow angle image, and a width length of the third image in the left-right direction is changed depending on a case of displaying the wide angle image or a case of displaying the narrow angle image.

7. A display control method for a display control device provided with a processor and a memory and mounted on a first vehicle in which a camera and a first display are mounted, wherein the camera photographs a first image indicating at least one of images having an angle of view in a horizontal direction on a rear right side and a rear left side of the first vehicle, wherein the first display is disposed on a dashboard along a left-right direction of the first vehicle, and the first display displays the first image and a second image which is displayed in a position adjacent to the first image and indicates various images other than the first image from the camera, and wherein, in the first image, the first display displays one of a narrow angle image and a wide angle image having an angle of view in the horizontal direction wider than an angle of view of the narrow angle image,
 the display control method comprising:
 an image acquiring step in which the display control device acquires the first image from the camera; and
 a display control step in which the display control device controls to switch between the wide angle image and the narrow angle image of the first image displayed on the first display, wherein
 the display control step includes the step of changing a width length of the first image in the left-right direction depending on a case of displaying the wide angle image or a case of displaying the narrow angle image, and
 when displaying the wide angle image of the first image in the first display, the display control step includes the step of expanding the width length of the first image toward the second image and making a width length of the second image smaller than the width length of the second image when displaying the narrow angle image of the first image, so that the first image does not overlap with the second image in the first display.

8. The display control method according to claim 7, wherein, in the display control step, when displaying the wide angle image of the first image, the display control device causes the first display to display the first image such that a magnification and reduction rate of the first image is substantially same compared with when displaying the narrow angle image.

9. The display control method according to claim 7, further comprising an information acquiring step in which the display control device acquires each of information concerning operation of the first vehicle, information concerning a second vehicle around the first vehicle, and information concerning a road on which the first vehicle travels, wherein
in the display control step, the display control device determines, according to the information acquired in the information acquiring step, whether to cause the first display to display the narrow angle image or cause the first display to display the wide angle image.

10. The display control method according to claim 9, further comprising a setting step in which the display control device sets a priority level for each of the kinds of information acquired in the information acquiring step, wherein
in the display control step, the display control device controls, according to the priority level, the first image displayed on the first display.

11. The display control method according to claim 7, wherein a second display is mounted on the first vehicle, the camera images the rear right side of the first vehicle to capture the first image and images the rear left side of the first vehicle to capture a third image, in the image acquiring step, the display control device acquires the first image and the third image from the camera, wherein, in the third image, the second display displays one of a narrow angle image and a wide angle image having an angle of view in the horizontal direction wider than an angle of view of the narrow angle image, in the display control step, the display control device controls the third image displayed on the second display to switch between the wide angle image and the narrow angle image, and a width length of the third image in the left-right direction is changed depending on a case of displaying the wide angle image or a case of displaying the narrow angle image.

12. The display control system according to claim 1, wherein a region displaying the second image in the first display is divided into a first display region and a second display region displaying different information, and at least one of a width length of the first display region and a width length of the second display region is changed depending on a case of displaying the wide angle image of the first image or a case of displaying the narrow angle image of the first image.

13. The display control method according to claim 7, wherein a region displaying the second image in the first display is divided into a first display region and a second display region displaying different information, and at least one of a width length of the first display region and a width length of the second display region is changed depending on a case of displaying the wide angle image of the first image or a case of displaying the narrow angle image of the first image.

14. The display control system according to claim 9, wherein a ratio of the magnification and reduction rate of the first image in the wide angle image and the magnification and reduction rate of the first image in the narrow angle image is 90% to 110%.

15. The display control method according to claim 8, wherein a ratio of the magnification and reduction rate of the first image in the wide angle image and the magnification and reduction rate of the first image in the narrow angle image is 90% to 110%.

* * * * *